United States Patent
Narayanan et al.

(10) Patent No.: US 9,959,114 B2
(45) Date of Patent: May 1, 2018

(54) REPRESENTATION OF CUSTOMIZABLE TYPES IN A DEVELOPMENT ENVIRONMENT

(71) Applicant: Microsoft Technology Licensing, LLC, Redmond, WA (US)

(72) Inventors: Suriya Narayanan, Redmond, WA (US); Nitinkumar Shah, Seattle, WA (US); Zhonghua Chu, Redmond, WA (US); Ed V. Budrys, Redmond, WA (US); Tomasz Kaminski, Issaquah, WA (US); Liang Yu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 237 days.

(21) Appl. No.: 14/798,669

(22) Filed: Jul. 14, 2015

(65) Prior Publication Data
US 2016/0274907 A1  Sep. 22, 2016

Related U.S. Application Data

(60) Provisional application No. 62/133,780, filed on Mar. 16, 2015.

(51) Int. Cl.
G06F 9/44 (2006.01)
(52) U.S. Cl.
CPC ............. *G06F 8/71* (2013.01); *G06F 8/33* (2013.01); *G06F 8/36* (2013.01)
(58) Field of Classification Search
CPC ................................ G06F 8/71; G06F 17/30076
(Continued)

(56) References Cited

U.S. PATENT DOCUMENTS 5,864,862 A    1/1999  Kriens et al.
6,662,199 B1  12/2003  Flight et al.
(Continued)

FOREIGN PATENT DOCUMENTS

WO    2013012690 A1   1/2013

OTHER PUBLICATIONS

Khan, et al., "Panaya Automates SAP Support Package Implementation", Published on: May 11, 2009 Available at: http://crm.syscon.com/node/957214.
(Continued)

*Primary Examiner* — Lewis A Bullock, Jr.
*Assistant Examiner* — Theodore Hebert
(74) *Attorney, Agent, or Firm* — Christopher J. Volkmann; Kelly, Holt & Christenson, PLLC

(57) ABSTRACT

A computing system comprises, in one example, a difference generation component configured to access a type file representing a type in a base version of a computing system and identify a customization made to the type in the base version of the computing system to obtain a customized version of the computing system, and a type accessing component configured to serialize the customization into a customization file of a given file format, the customization file having a separate element representing each customization made to the type in the base version of the computing system to obtain the customized version of the computing system, the type accessing component storing the customization file as a separate file from the type file.

14 Claims, 34 Drawing Sheets

(58) Field of Classification Search
USPC .......................................................... 717/122
See application file for complete search history.

(56) References Cited

U.S. PATENT DOCUMENTS

| | | | |
|---|---|---|---|
| 6,868,413 B1 | 3/2005 | Grindrod et al. | |
| 7,065,771 B1* | 6/2006 | Prabhu | G06F 9/465 |
| | | | 719/330 |
| 7,076,778 B2 | 7/2006 | Brodersen et al. | |
| 7,080,089 B2* | 7/2006 | Plaisted | G06F 8/36 |
| | | | 707/803 |
| 7,577,934 B2 | 8/2009 | Anonsen et al. | |
| 7,711,688 B2 | 5/2010 | Plaisted et al. | |
| 7,945,596 B2 | 5/2011 | Anonsen et al. | |
| 8,522,083 B1* | 8/2013 | Cohen | G06F 11/3672 |
| | | | 714/38.1 |
| 8,639,729 B2 | 1/2014 | Patil | |
| 8,726,234 B2* | 5/2014 | Mital | G06F 8/10 |
| | | | 717/110 |
| 8,782,606 B1 | 7/2014 | Cohen et al. | |
| 9,038,037 B1* | 5/2015 | Biggerstaff | G06F 8/437 |
| | | | 717/108 |
| 9,218,179 B2 | 12/2015 | Huff, II et al. | |
| 9,389,934 B1* | 7/2016 | Zhang | G06F 9/542 |
| 2004/0181291 A1* | 9/2004 | Plaisted | G06F 8/36 |
| | | | 700/1 |
| 2005/0108627 A1 | 5/2005 | Mireku | |
| 2005/0240943 A1* | 10/2005 | Smith | G06F 9/465 |
| | | | 719/328 |
| 2006/0130047 A1 | 6/2006 | Burugapalli | |
| 2006/0271910 A1 | 11/2006 | Burcham et al. | |
| 2006/0294506 A1 | 12/2006 | Dengler et al. | |
| 2007/0038978 A1* | 2/2007 | Meijer | G06F 8/437 |
| | | | 717/106 |
| 2008/0005150 A1* | 1/2008 | Gupta | G06F 17/30067 |
| 2008/0065443 A1 | 3/2008 | Gorur et al. | |
| 2008/0071817 A1* | 3/2008 | Gaurav | G06F 8/71 |
| 2008/0086499 A1* | 4/2008 | Wefers | G06Q 10/06 |
| 2008/0163160 A1* | 7/2008 | Bloesch | G06F 9/4428 |
| | | | 717/104 |
| 2008/0178166 A1* | 7/2008 | Hunter | G06F 9/44521 |
| | | | 717/165 |
| 2008/0183725 A1* | 7/2008 | Blakeley | G06F 17/30584 |
| 2008/0250071 A1 | 10/2008 | Norring et al. | |
| 2009/0006933 A1* | 1/2009 | Gavrilov | G06F 17/30297 |
| | | | 714/819 |
| 2009/0119311 A1* | 5/2009 | Kohli | G06F 8/71 |
| 2009/0307650 A1* | 12/2009 | Saraf | G06F 8/65 |
| | | | 717/101 |
| 2009/0328026 A1 | 12/2009 | Yamashita et al. | |
| 2010/0058294 A1 | 3/2010 | Best et al. | |
| 2010/0077380 A1* | 3/2010 | Baker | G06F 8/72 |
| | | | 717/120 |
| 2010/0306010 A1 | 12/2010 | Winther et al. | |
| 2011/0119649 A1* | 5/2011 | Kand | G06F 8/35 |
| | | | 717/100 |
| 2011/0119651 A1* | 5/2011 | Utschig-Utschig | G06F 8/35 |
| | | | 717/107 |
| 2011/0307798 A1 | 12/2011 | Lezama Guadarrama et al. | |
| 2012/0144380 A1* | 6/2012 | Rabeler | G06F 8/68 |
| | | | 717/170 |
| 2012/0210296 A1* | 8/2012 | Boulter | G06Q 10/0631 |
| | | | 717/107 |
| 2012/0254103 A1* | 10/2012 | Cottle | G06F 17/30563 |
| | | | 707/602 |
| 2012/0260233 A1* | 10/2012 | Bandyopadhyay | G06F 8/36 |
| | | | 717/107 |
| 2012/0297365 A1* | 11/2012 | Altin | G06F 9/4435 |
| | | | 717/124 |
| 2013/0067053 A1* | 3/2013 | Kaplan | G06F 17/30569 |
| | | | 709/223 |
| 2013/0067456 A1* | 3/2013 | Khilnani | G06Q 10/067 |
| | | | 717/174 |
| 2013/0339254 A1 | 12/2013 | Figlin et al. | |
| 2014/0108975 A1 | 4/2014 | Yu et al. | |
| 2014/0304694 A1* | 10/2014 | Huff, II | G06F 8/68 |
| | | | 717/168 |
| 2015/0113500 A1 | 4/2015 | Badawy et al. | |
| 2015/0254316 A1* | 9/2015 | Charlet | G06F 17/30569 |
| | | | 707/756 |
| 2016/0274889 A1 | 9/2016 | Kaminski et al. | |

OTHER PUBLICATIONS

Daloe, "Acumatica ERP 4.1—Customization Guide", Published on: Sep. 8, 2014 Available at: http://www.slideshare.net/daloe/acumatica-erp-41-customization-guide?qid=78a95072-720d-4afd-a47c-92f6ef450f1e&v=default&b=8,from_search=1.

"Acumatica-Development Tools", Retrieved on: Feb. 20, 2015 Available at: http://www.acumatica.com/cloud-erp-products_4/development-tools/.

"Oracle Business Intelligence—Be the First to Know", Published on: Jan. 27, 2012 Available at http://www.oracle.com/us/products/oracle-bi-apps-erp-analytics-1401327.pdf.

"Acumatica—Customization and Integration", Retrieved on: Feb. 20, 2015 Available at: http://www.acumatica.com/cloud-erp-products_4/customization-and-integration/.

"International Search Report & Written Opinion Issued in PCT Application PCT/US2016/022398", dated Jun. 3, 2016, 13 Pages.

Prosecution History for U.S. Appl. No. 14/800,393 including: Non-Final Office Action dated Dec. 29, 2016, Amendment dated Aug. 4, 2016, and Non-Final Office Action dated Apr. 14, 2016, 72 pages.

Amendment for U.S. Appl. No. 14/800,393 dated Mar. 27, 2017, 14 pages.

Non-Final Office Action for U.S. Appl. No. 14/800,393 dated Jun. 12, 2017, 29 pages.

"Acumatica Framework-Development Guide", Retrieved on: Feb. 20, 2015 Available at: http://adn-acumaticainc.netdna-ssl.com/wp-content/uploads/2014/05/AcumaticaFramework_DevelopmentGuide.pdf.

Miletić, et al., "Towards Model-Driven Approach for Rapid ERP Development", In Proceedings of the Fourteenth East-European Conference on Advances in Databases and Information Systems, Sep. 20, 2010, pp. 126-130.

Hodson, Brad, "You Have The Power: Customizable CRM Software", Published on: Oct. 24, 2013 Available at: http://www.jobnimbus.com/blog/2013/10/24/you-have-the-power-customizable-crm-software/.

Yachin, Dan., "SAP ERP Life-Cycle Management Overcoming the Downside of Upgrading", In White Paper, Sep. 2009, 9 pages.

Luo, et al., "A Framework for Evaluating ERP Implementation Choices", In Proceedings of IEEE Transactions on Engineering Management, vol. 51, Issue 3, Aug. 2004, pp. 322-333.

"Host Your Own Gallery", Published on: Jul. 2, 2014 Available at: http://www.alteryx.com/products/alteryx-server.

Final Office Action for U.S. Appl. No. 14/800,393 dated Dec. 6, 2017, 25 pages.

Amendment with RCE for U.S. Appl. No. 14/800,393 dated Feb. 19, 2018, 14 pages.

* cited by examiner

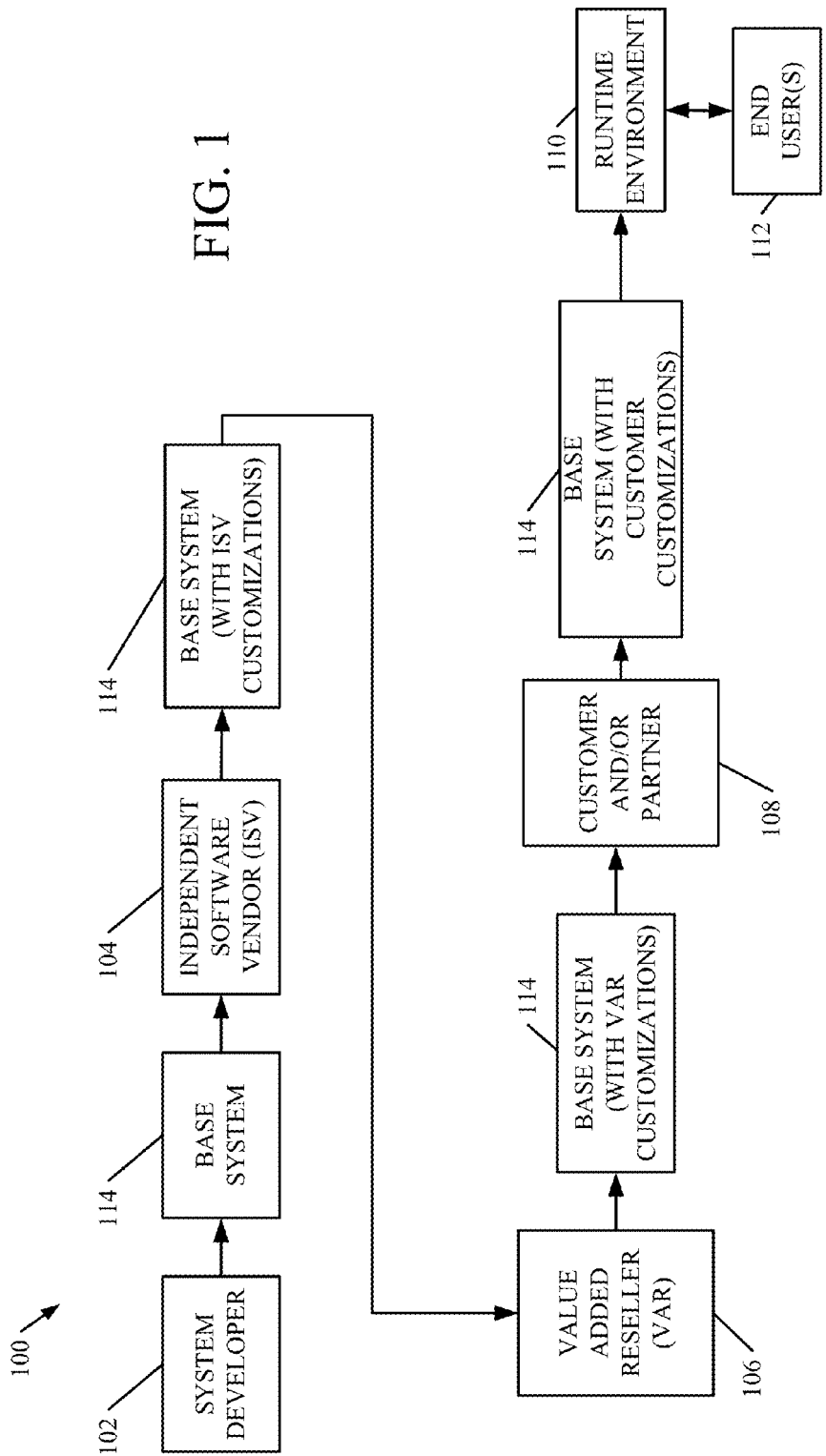

FIG. 3-2

```
<DomainClass Id="d984fd2c-1685-4118-beef-c07ab0e0d2c8" Description="Description for
Microsoft.Dynamics.Framework.Tools.MetaModel.Forms.Form" Name="Form" DisplayName="Form"
Namespace="Microsoft.Dynamics.Framework.Tools.MetaModel.Forms" HasCustomConstructor="true">
    <Attributes>
      <ClrAttribute
Name="Microsoft.Dynamics.AX.Metadata.Core.MetaModel.PluralDisplayNameAttribute">
        <Parameters>
          <AttributeParameter Value=""Forms"" />
        </Parameters>
      </ClrAttribute>
      <ClrAttribute
Name="Microsoft.Dynamics.Framework.Tools.MetaModel.Core.MergeReferenceAttribute">
        <Parameters>
          <AttributeParameter
Value="typeof(Microsoft.Dynamics.Framework.Tools.MetaModel.Tables.Table)" />
          <AttributeParameter
Value="typeof(Microsoft.Dynamics.Framework.Tools.MetaModel.Forms.FormDataSourceRoot)" />
          <AttributeParameter Value=""Table"" />
        </Parameters>
      </ClrAttribute>
      <ClrAttribute
Name="Microsoft.Dynamics.Framework.Tools.MetaModel.Core.MergeReferenceAttribute">
        <Parameters>
          <AttributeParameter
Value="typeof(Microsoft.Dynamics.Framework.Tools.MetaModel.Query)"/>
          <AttributeParameter
Value="typeof(Microsoft.Dynamics.Framework.Tools.MetaModel.Forms.FormDataSourceRoot)" />
          <AttributeParameter Value=""Table"" />
        </Parameters>
      </ClrAttribute>
      <ClrAttribute
Name="Microsoft.Dynamics.Framework.Tools.MetaModel.Core.MergeReferenceAttribute">
        <Parameters>
          <AttributeParameter
Value="typeof(Microsoft.Dynamics.Framework.Tools.MetaModel.Views.View)" />
          <AttributeParameter
Value="typeof(Microsoft.Dynamics.Framework.Tools.MetaModel.Forms.FormDataSourceRoot)" />
          <AttributeParameter Value=""Table"" />
        </Parameters>
      </ClrAttribute>
      <ClrAttribute
```

FIG. 12D-1

```
Name="Microsoft.Dynamics.Framework.Tools.MetaModel.Core.MergeReferenceAttribute">
    <Parameters>
      <AttributeParameter
Value="typeof(Microsoft.Dynamics.Framework.Tools.MetaModel.DataEntityViews.DataEntityView)" />
      <AttributeParameter
Value="typeof(Microsoft.Dynamics.Framework.Tools.MetaModel.Forms.FormDataSourceRoot)" />
      <AttributeParameter Value=""Table"" />
    </Parameters>
  </ClrAttribute>
  <ClrAttribute
Name="Microsoft.Dynamics.Framework.Tools.MetaModel.Core.MergeReferenceAttribute">
    <Parameters>
      <AttributeParameter
Value="typeof(Microsoft.Dynamics.Framework.Tools.MetaModel.Maps.Map)" />
      <AttributeParameter
Value="typeof(Microsoft.Dynamics.Framework.Tools.MetaModel.Forms.FormDataSourceRoot)" />
      <AttributeParameter Value=""Table"" />
    </Parameters>
  </ClrAttribute>
  <ClrAttribute
Name="Microsoft.Dynamics.Framework.Tools.MetaModel.Core.MergeReferenceAttribute">
    <Parameters>
      <AttributeParameter
Value="typeof(Microsoft.Dynamics.Framework.Tools.MetaModel.Aggregates.AggregateDataEntity)" />
      <AttributeParameter
Value="typeof(Microsoft.Dynamics.Framework.Tools.MetaModel.Forms.FormDataSourceRoot)" />
      <AttributeParameter Value=""Table"" />
    </Parameters>
  </ClrAttribute>
</Attributes>
<BaseClass>
  <DomainClassMoniker Name="/Microsoft.Dynamics.Framework.Tools.MetaModel/RootElement"
/>
</BaseClass>
<Properties>
  <DomainProperty Id="96435555-0086-4f67-b404-2b73b4076462" Description="Specifies the form
template." Name="FormTemplate" DisplayName="Form Template" DefaultValue="None"
Category="Behavior">
    <Type>
      <ExternalTypeMoniker
```

FIG. 12D-2

```
Name="/Microsoft.Dynamics.AX.Metadata.Core.MetaModel/FormTemplate_ITxf" />
    </Type>
  </DomainProperty>
  <DomainProperty Id="c85818ec-f59f-468f-98c8-cb14ae29947b" Description="Query that defines
the view" Name="DataSourceQuery" DisplayName="Data Source Query" Category="Data">
    <Attributes>
      <ClrAttribute Name="Microsoft.Dynamics.AX.Metadata.Core.MetaModel.RootRefAttribute">
        <Parameters>
          <AttributeParameter
Value="typeof(Microsoft.Dynamics.AX.Metadata.MetaModel.AxQuery)" />
        </Parameters>
      </ClrAttribute>
      <ClrAttribute Name="System.ComponentModel.TypeConverter">
        <Parameters>
          <AttributeParameter
Value="typeof(Microsoft.Dynamics.Framework.Tools.MetaModel.QueryTypeConverter)" />
        </Parameters>
      </ClrAttribute>
      <ClrAttribute
Name="Microsoft.Dynamics.AX.Metadata.Core.MetaModel.FrequencyPropertyAttribute">
        <Parameters>
          <AttributeParameter
Value="Microsoft.Dynamics.AX.Metadata.Core.MetaModel.FrequencyPropertyUsage.Common" />
        </Parameters>
      </ClrAttribute>
    </Attributes>
    <Type>
      <ExternalTypeMoniker Name="/System/String" />
    </Type>
  </DomainProperty>
```

FIG. 12D-3

```
<?xml version="1.0" encoding="utf-8"?>
<DslLibrary xmlns:dm0="http://schemas.microsoft.com/VisualStudio/2008/DslTools/Core"
xmlns:dm1="http://schemas.microsoft.com/dsltools/DynDslExtension" dslVersion="1.0.0.0"
Id="8887f586-c1f2-4ba2-a662-a4ff83d0909e" Description="Description for
Microsoft.Dynamics.Framework.Tools.MetaModel.Forms" Name="Form" DisplayName="Form"
Namespace="Microsoft.Dynamics.Framework.Tools.MetaModel.Forms"
xmlns="http://schemas.microsoft.com/VisualStudio/2005/DslTools/DslDefinitionModel">
  <dm0:extensions>
    <dynDslDomainClassExtension Id="861d4f35-0a80-4011-83a6-6b896be037ae"
dataContractNamespace="Microsoft.Dynamics.AX.Metadata.V6" excludeFromDataContract="false"
dataContractTypeName="AxForm" interfacesImplementations="IMethodCollection,
IFormDataSourceCollection, ISingleKeyedMetadata<string>"
useAsEmbeddingCrossDslReferenceType="false" containsCode="true"
compilerMetadataTypeName="AxFormPropertyCollection"
sourceCodeTypeName="AxFormPropertyCollection" sourceCodeDataMemberOrder="1"
compilerMetadataDataMemberOrder="4">
      <extendedElement>
        <DomainClassMoniker Name="/Microsoft.Dynamics.Framework.Tools.MetaModel.Forms/Form"
/>
      </extendedElement>
    </dynDslDomainClassExtension>
    <dynDslDomainClassExtension Id="b3cfa125-27ca-4bcd-a4dd-f114ffa6574b"
excludeFromDataContract="false" dataContractTypeName="AxFormDesign"
interfacesImplementations="IFormControlCollection" useAsEmbeddingCrossDslReferenceType="false"
containsCode="false" sourceCodeDataMemberOrder="0" compilerMetadataDataMemberOrder="0">
      <extendedElement>
        <DomainClassMoniker
```

FIG. 12D-4

```
Name="/Microsoft.Dynamics.Framework.Tools.MetaModel.Forms/FormDesign" />
    </extendedElement>
  </dynDslDomainClassExtension>
  <dynDslDomainClassExtension Id="b2586b2b-e881-47b5-8f73-b71440c4a214"
excludeFromDataContract="false" dataContractTypeName="AxFormPartReference"
interfacesImplementations="IKeyedObject<string>"
useAsEmbeddingCrossDslReferenceType="false" containsCode="false"
sourceCodeDataMemberOrder="0" compilerMetadataDataMemberOrder="0">
    <extendedElement>
      <DomainClassMoniker
Name="/Microsoft.Dynamics.Framework.Tools.MetaModel.Forms/FormPartReference" />
    </extendedElement>
  </dynDslDomainClassExtension>
  <dynDslDomainClassExtension Id="c093ecce-dae3-426f-9bf9-31403302f32e"
excludeFromDataContract="false" dataContractTypeName="AxFormDataSource"
interfacesImplementations="IFormDataSourceCollection, IKeyedObject<string>"
useAsEmbeddingCrossDslReferenceType="false" containsCode="false"
sourceCodeDataMemberOrder="0" compilerMetadataDataMemberOrder="0">
    <extendedElement>
      <DomainClassMoniker
Name="/Microsoft.Dynamics.Framework.Tools.MetaModel.Forms/FormDataSource" />
    </extendedElement>
```

FIG. 12D-5

REPRESENTATION OF CUSTOMIZABLE TYPES IN A DEVELOPMENT ENVIRONMENT

CROSS-REFERENCE TO RELATED APPLICATION

The present application is based on and claims the benefit of U.S. provisional patent application Ser. No. 62/133,780, filed Mar. 16, 2015, the content of which is hereby incorporated by reference in its entirety.

BACKGROUND

Computing systems are currently in wide use. Some computing systems are relatively large, and may include, for instance, thousands of different user interface and data entities, like tables and other artifacts. Such computing systems are often customized (some heavily customized) before they are deployed in a given implementation. For example, computer programs can be developed on various development tools. Many software developers use interactive (or integrated) development environments (IDEs) in order to develop software. The developers use an IDE in order to develop models of types within a computing system, and in order to customize those models.

By way of example, some computing systems include enterprise resource planning (ERP) systems, customer relations management (CRM) systems, line-of-business (LOB) systems, among others. These types of computing systems often include many thousands of different types that are modeled and customized. By way of example, some such systems often have thousands of different forms, alone, not to mention many other types. Such systems also commonly include a great deal of logic, as well as workflows, and data entities (such as tables) that allow users to access the system and perform a set of activities, or tasks, in order to carry out their duties within a particular organization for which they are working.

These systems are not the only types of computing systems that have a large number of types. For instance, gaming systems, or a wide variety of other types of systems, often also have many thousands of different types that are modeled in the computing system.

The various types that are modeled in the computing system are compiled (or assembled) into assemblies that are run during runtime. The modeled types can represent data or workflow. For instance, the computing system may store information as a collection of entities, where each entity represents an item associated with an organization. A customer entity, for example, may represent a customer. A sales order entity, for instance, may represent a sales order. A sales quote entity may represent a sales quote. These are illustrative examples only.

When such a computing system is deployed in a specific organization, it is common for the computing system to be highly customized in order to meet the functional requirements of the particular organization in which it is deployed. By way of example, different organizations may wish to have different fields on a given form that represents a customer entity. In addition, for example, different organizations may wish to have different logic for computing a currency conversion on an expense report form. Thus, it can be seen that a given computing system may be heavily customized so that it meets the requirements of a given organization that is using it.

A computing system may also have multiple different layers of customization. For instance, a software company that has created and developed the basic system may simply sell the system as a base product. An independent software vendor (ISV) may then generate a set of customizations to the base product, so that the base product can be resold with those customizations. A value added reseller (VAR) may add another layer of customizations, and the ultimate end user of the product may be in a partnership with a development partner, where the development partner adds their own customizations.

Currently, when a developer or other programmer generates customizations to a base product, the customizations are used to overwrite the base application models in the base product. Such overwriting is achieved by compiling the application model with the changes (to reflect the customizations) already made.

The discussion above is merely provided for general background information and is not intended to be used as an aid in determining the scope of the claimed subject matter.

SUMMARY

A computing system comprises, in one example, a difference generation component configured to access a type file representing a type in a base version of a computing system and identify a customization made to the type in the base version of the computing system to obtain a customized version of the computing system, and a type accessing component configured to serialize the customization into a customization file of a given file format, the customization file having a separate element representing each customization made to the type in the base version of the computing system to obtain the customized version of the computing system, the type accessing component storing the customization file as a separate file from the type file.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 3-1 is a flow diagram of one example of a method for generating a customized system.

FIG. 3-2 illustrates one example of an XML file representations of a base type.

FIGS. 7-1 and 7-2 are screenshots of examples of integrated views.

FIGS. 8-1, 8-2 and 8-3 illustrate example elements that have been customized.

FIG. 8-4 is a screenshot of one example of a conflict resolution window.

FIGS. 8-5 and 8-6 are screenshots of an example of a view showing hierarchy customization conflicts.

FIGS. 9-1, 9-2, and 9-3 are screenshots of examples of user interfaces provided by a lifecycle management system.

FIGS. 12D-1 to 12D-5 (collectively referred to herein as FIG. 12D) shows one example of XML for DSL and one example of DSL for DSL extensions.

DETAILED DESCRIPTION

Figures 1, 3:
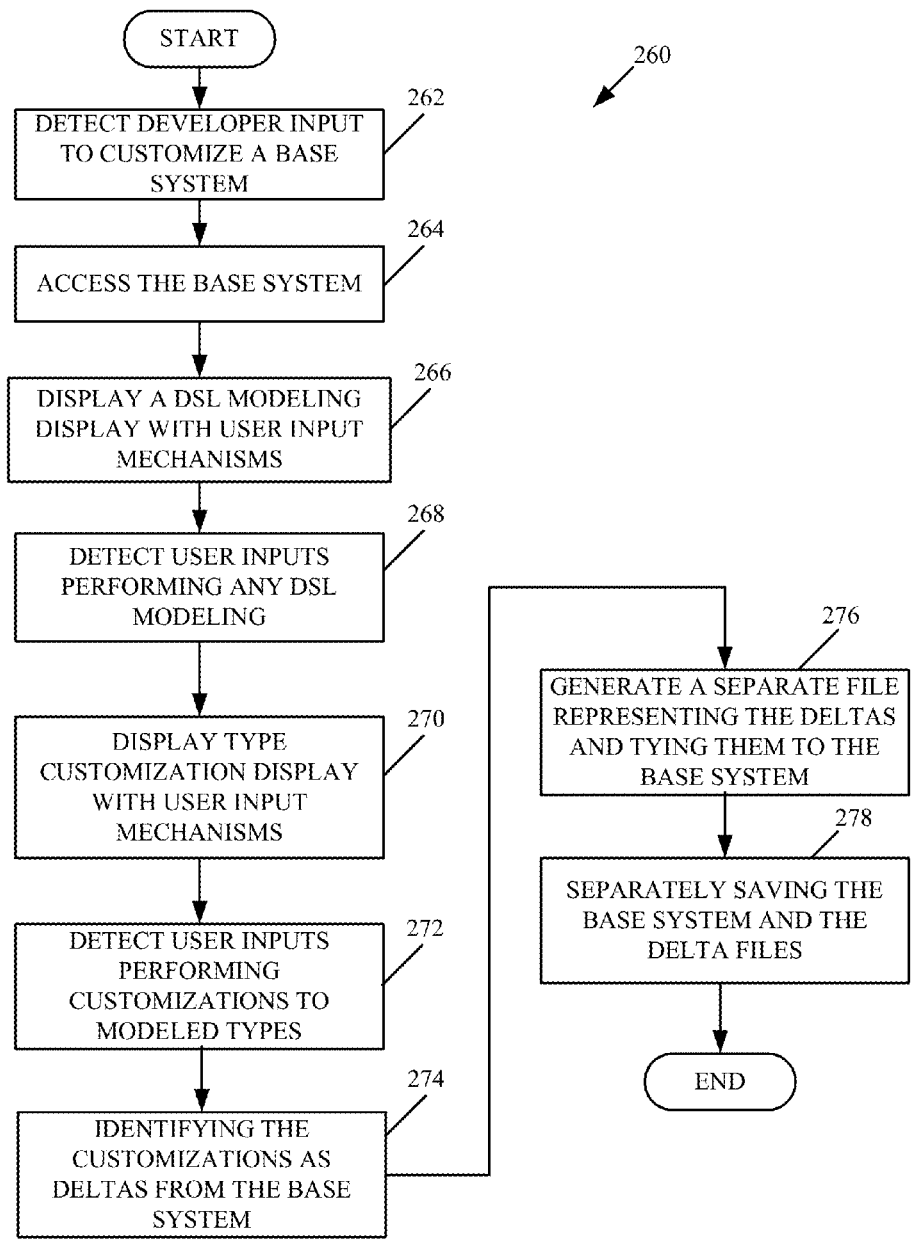

FIG. 1 is a block diagram of one example of a development channel 100. Development channel 100 may illustratively include system developer 102, independent software vendor (ISV) 104, value added reseller (VAR) 106, partner or customer 108, a runtime environment 110, and end user 112. FIG. 1 shows that system developer 102 may illustratively be an original software manufacturer that designs and develops a base system 114, such as a base business software system. For instance, base system 114 may be a gaming system, an ERP system, a CRM system, an LOB system, etc.

Depending on the type of system, it may be that base system 114 is heavily customized or extended before it is deployed in runtime environment 110, for use by one or more end users 112. By way of example, ISVs 104 often customize base system 114 and make it available to value added resellers 106 which, themselves, customize the base system 114 (after it has already been customized by independent software vendor 104). It may also be that a customer 108, such as an organization of end user 112, desires to even further customize the base system 114 to meet the functional requirements of the organization, so that it can be successfully deployed in runtime environment 110. Alternatively, or in addition, customer 108 may partner with a partner in further customizing the base system 114.

This type of customization can be problematic. For example, when system developer 102 attempts to publish an update to the base system 114, the update may, in some ways, be incompatible with the end user's customizations. Therefore, if the end user attempts to install the update, this can create problems. Further, even where system developer 102 is simply attempting to maintain the code base of the base system 114, this can also create problems where the maintenance conflicts with customizations that have made by ISV 104, VAR 106, and/or customer 108.

Figure 2:
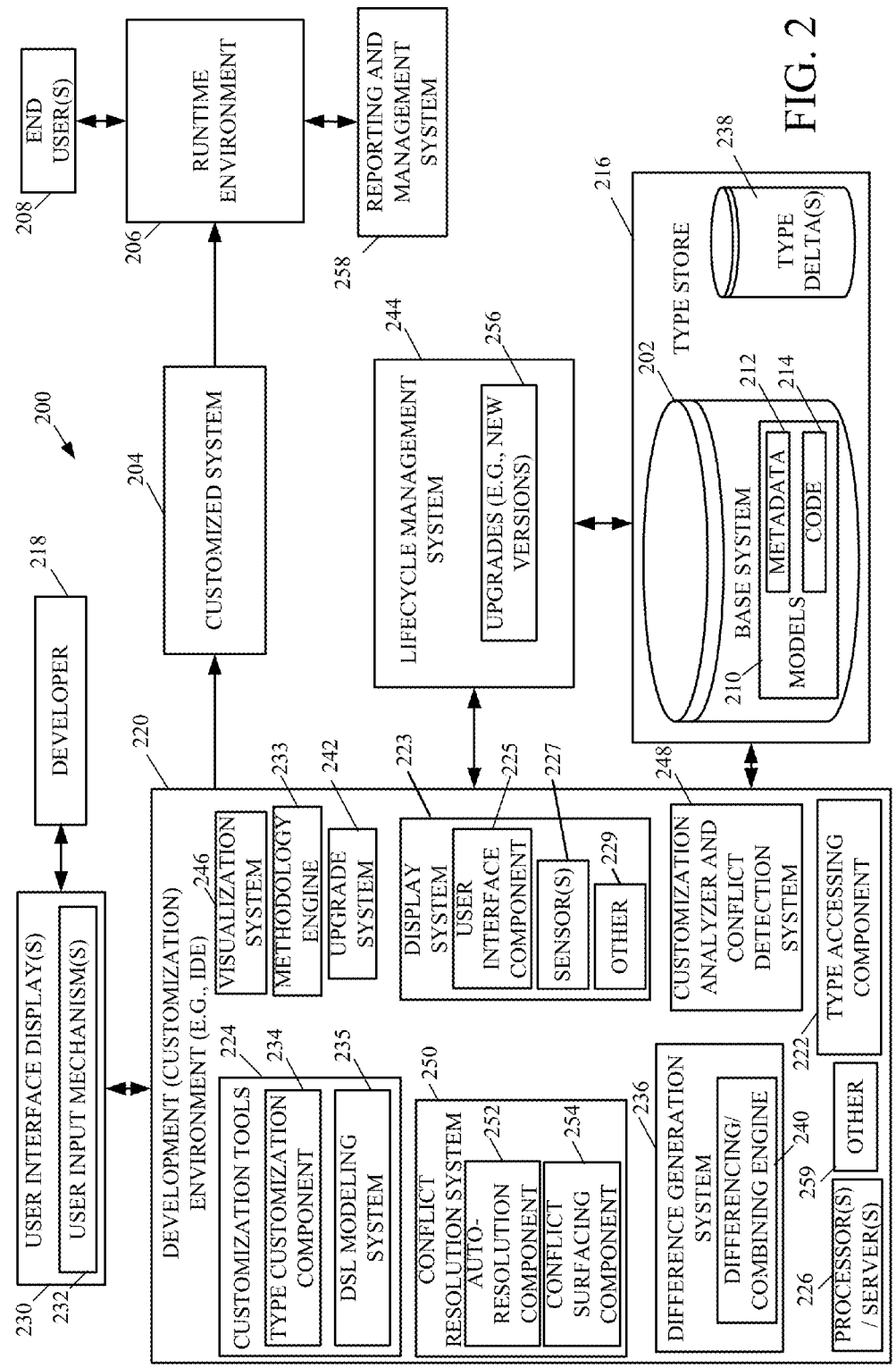
FIG. 2 is a block diagram of one example of a development architecture having development functionality for developing a base system.

FIG. 2 is a block diagram of one example of a development (customization) architecture 200 having development functionality for developing a base system 202 having application elements (or objects) that are run in a computing system. By way of example, development architecture 200 can be used by any of ISV 104, VAR 106, and/or customer 108 to customize base system 202 to meet the functional requirements of an organization, so that the customized system 204 can be successfully deployed in a runtime environment 206 used by an end user 208 of the organization. In this example, architecture 200 can represent any portion of the development channel 100 shown in FIG. 1.

FIG. 2 shows that, in one example, base system 202 includes models 210. Models 210 comprise containers that hold corresponding metadata 212 and can have code 214 as well. In the illustrated example, models 210 include metadata and code corresponding to various different types of application elements (i.e., types) within base system 202. Depending on the particular base system, models 210 can comprise thousands of different elements types that are stored in a type store 216. The types can be defined based on a type system framework employed by a development environment 220 (e.g., an interactive or integrated development environment (IDE)).

A "type" represents an abstraction, representing concepts modeled in a system. In one example, architecture 200 employs a rich hierarchical type system where base types can be extended to create more complex subtypes. A base type comprises a basic or primitive component within the models. Examples of base types include, but are not limited to, an integer type, a string type, a floating point number type, an enumeration value type, a Boolean type, etc. These base types can be extended to create subtypes such as, but not limited to, a quantity type, a currency code type, a sales price type, an hour type, etc. These subtypes can be further extended to create more complex types.

For instance, types can be used to represent various abstractions or concepts in an organization (such as, but not limited to, a customer, a sales order, an employee, etc. in an ERP or CRM system) or in the way the organization information is processed for the specific needs of the organization (such as hiring an employee, creating an order, process an approval, etc.). Some examples of such types include, but are not limited to, tables (which each represent a persisted, object such as a sales order), classes (that contain logic), forms (that represent the presentation of information for the consumers of the information), security roles (represents the access control for information to the consumers), workflows (that represents the flow of processes), menu items, entities, permissions, and other supporting concepts to define the application. These types are defined by a structure of elements each described using a set of attributes or properties (e.g., key/value pairs) and an associated set of operations that are used to interact with the construct. The particular structure of properties, methods, and/or computations define runtime behavior for elements of the given element type. For instance, table objects contain metadata and code for persisting application data in a database, and form objects contain metadata and code to describe information content to be displayed in various devices for application users to consume information and interact with the application.

In this manner, each element type has a particular structure of properties, methods, and/or computations that define runtime behavior for elements of that element type. For example, a table element type can include a name (e.g., "customer table") and a set of properties that identify attributes for a customer (e.g., customer ID, address, etc.). Also, in this example, the table element type can include a method for computing a value for the customer and/or a method for displaying the value.

The instances of the types are designed by a developer 218 (e.g., developer 218 designs what the customer table or sales order form should look like) and a runtime environment 206, at the time of running the customized system 204, creates, manages and persists specific instances of these types (e.g., customer table type and sales order type, etc.) and provides a framework and an environment for these instances to interact with each other.

The types of system 202 are persisted or stored in type store 216 as documents or files with a defined schema (e.g., extensible markup language (XML), javascript object notation (JSON), a proprietary schema, etc.) in a storage medium, such as a computer file system, database, or cloud storage. For sake of the present discussion, but not by limitation, type store 216 will described as storing the types in type store as XML files. Of course, this by way of example only. Other formats can be utilized.

In this example, metadata 212 and code 214 for each type are serialized into one XML file. That is, snippets of code (i.e., unstructured strings) and metadata (i.e., structured sets of properties and values) are interspersed in the XML file. As such, the metadata and code XML files comprise serialized element structures, each with its own type.

Development environment 220 includes a type accessing component 222 that stores the types in type store 216 and that accesses the stored types from type store 216. In one example, type accessing component 222 is configured to serialize the types into their storage (e.g., XML file) representations as they are stored into type store 216, and to deserialize the storage representations into their physical, source code representations as they are retrieved from type store 216 for development within development environment 220. The source code representations can comprise objects in an object-oriented programming environment. Any suitable programming language(s) can be utilized in development environment 220.

In order to customize base system 202, developer 218 requires that some or all of the types need to be customized, to various degrees, depending on the organizational needs and the unique requirements the organization faces to differentiate them in the market place.

To facilitate customization of base system 202, developer 218 uses customization tools 224 of development environment 220 to make customizations to the base system 202. In the example shown in FIG. 2, the development environment 220 illustratively corresponds to the environment in which customer 108 makes customizations to base system 114. It will be noted, however, that development environment 220 can be an environment in which any developer in development channel 100 (shown in FIG. 1), or any other developer in any other channel, makes customizations to a base system.

By way of example, an IDE (or other development environment) may include a source code editor, one or more build automation tools and a debugger. Some IDEs illustratively include a compiler, an interpreter, or both. They may include a version control system and various tools to simplify the construction of graphical user interfaces. They can also include a class browser, an object browser, and a class hierarchy diagram for use with object oriented software development. Thus, developers can use IDEs to generate the code and metadata, along with customizations to code and metadata, which may be utilized in developing a system for use in a given organization.

Developer 218 can interact with development environment 220 either through a separate developer device (such as a personal computer, a tablet, another mobile device, etc.), or directly. Developer 218 can also interact with development environment 220 over a network (e.g., remotely). Developer 218 is shown interacting directly (e.g., locally) with development environment 220 in FIG. 1 for the sake of example only.

Development environment 220, in one example, includes processor(s) and/or server(s) 226, a display system 223 (which, itself, includes a user interface component 225 and one or more sensors 227, and it can include other items 229 as well), a difference generation system 236, an upgrade system 242, a visualization system 246, a customization analyzer and conflict detection system 248, and a conflict resolution system 250. Development environment 220 can include other items 259 as well.

FIG. 2 shows a variety of different blocks. It will be noted that the blocks can be consolidated so that more functionality is performed by each block, or they can be divided so that the functionality is further distributed. It should also be noted that type store 216 can comprise, in one example, any of a wide variety of different types of data stores. Further, the data in the data store can be stored in multiple additional data stores as well. Also, the data stores can be local to the environments, agents, modules, and/or components that access them, or they can be remote therefrom and accessible by those environments, agents, modules, and/or components. Similarly, some can be local while others are remote.

User interface component 225 generates user interface displays 230 with user input mechanisms 232, for interaction by developer 218. Developer 218 interacts with user input mechanisms 218 in order to control and manipulate development environment 220. In one example, developer 218 can do this to implement customization tools 224 or any other component(s) of development environment 220.

Sensor(s) 227 are configured to detect inputs to display system 223. In one example, one or more of systems 236, 242, 246, 248, and 250 also include sensors configured to detect inputs to those systems.

In one example, processor(s) and/or server(s) 226 comprises a computer processor with associated memory and timing circuitry (not shown). The computer processor is a functional part of environment 220 and is activated by, and facilitates the functionality of, other systems, components and items in environment 220. In one example, one or more of systems 236, 242, 246, 248, and 250 can also include processor(s).

User input mechanisms 232 sense physical activities, for example by generating user interface displays 230 that are used to sense user interaction with environment 220. The user interface displays can include user input mechanisms that sense user input in a wide variety of different ways, such as point and click devices (e.g., a computer mouse or track ball), a keyboard (either virtual or hardware), and/or a keypad. Where the display device used to display the user interface displays is a touch sensitive display, the inputs can be provided as touch gestures. Similarly, the user inputs can illustratively be provided by voice inputs or other natural user interface input mechanisms as well.

Development environment 220, in one example, includes a methodology engine 233 for defining and performing various methods and processes within development environment 220. Methodology engine 233 facilitates an automated framework that uses code generation to drive the implementation of generating the deltas representing changes to the base system, storing the deltas, and applying the deltas to the base system to construct the customized system.

As illustrated in FIG. 2, customization tools 224 include a type customization component 234 that enables developer 218 to customize the types in models 210 of base system 202. For purposes of the present discussion, customizations will be used to mean additive changes to the metadata 212 or code 214 or functionality of base system 114, as well as non-additive changes.

One type of customization comprises adding metadata or code to a given element type. In one example, objects of a form type can be customized by adding a new property, such as a new field, on the form or adding a new method to perform a calculation on data entered on the form or display data via a presentation element in the form. In another example, objects of an employee type can be customized by adding a "hire date" property or adding a new method for determining a raise for employee's salary. In another example, objects of a customer type can be customized by adding a new field to the customer indicating required service levels (e.g., gold customer/silver customer/brass customer, etc.).

Another type of customization comprises deleting or changing properties to a given element type. In one example, objects of a form type can be customized by changing a width of a field. In another example, objects of a customer type can be customized by changing a property value (e.g., changing a customer ID field representing a customer from 10 to 15, changing a label "customers" to "clients", etc.). For instance, to account for a geographical location in which the system is deployed, a customer address within customer objects can be customized to have more detailed information.

Another type of customization comprises changing a hierarchical arrangement of the metadata elements for a given element type. To illustrate, in one particular example, objects of a form element type comprise a control (e.g., a reset button) that is a child node under a parent node. The parent node comprises a tab labeled "General." Developer 218 may desire to move the control under a different tab labeled "Details." To accomplish this, the developer 218 moves or re-parents the child node, corresponding to the control, to a different parent node corresponding to the "Details" tab.

Of course, these are only examples of how customizations can be made to metadata or code, and a wide variety of other customizations can be made as well.

When developer 218 develops customized system 204 by customizing types within base system 202, the customizations are stored as deltas which represent the type differences between the customized system 204 and the base system 202. In one example, difference generation system 236 computes, for each type that is customized by developer 218, a delta or difference between the customized type in customized system 204 and the base form of the type in base system 202.

In one embodiment, difference generation system 236 uses an object model to capture how an instance of a given type can change (such as between versions of base system 202 or different customization layers). In one example, this object model is inferred from a meta model that defines the type system framework within development environment 220, which specifics the structure of individual types in models 210. The meta model allows a given object to be inspected at any time to determine what customizations have been made to the object. This meta model can be obtained using a domain specific language modeling system 235, in one example.

Once the delta for the customized type is computed by difference generation system 236, it is then serialized into an XML file (or other format) by type accessing component 222. Each element in the XML file represents a particular change to the base type in base system 202. In one example, type accessing component 222 serializes the delta into the XML file using the meta model. The meta model defines the schema of the XML file. The XML file is stored in type delta store 238. In this manner, the delta is represented by a separately stored XML file, that is separate from the corresponding XML file stored for the base type of base system 202. While the delta file is separate from the XML files for base system 202, it can be stored in the same physical data store (i.e., type store 216). In another example, the delta file can be stored remote from the base system 202.

A given type in base system 202 can have multiple different layers of customization. For example, multiple entities can each provide different customization to the type. The multiple layers of customization of the type can apply to a same portion of metadata or code, or to different portions of metadata. With respect to development channel 100 shown in FIG. 1, base system 114 can be customized by ISV 104, and then further customized by VAR 106 and/or customer 108. Thus, the type can have multiple delta files in type delta store 238. Each delta file comprises a layer of customization.

In a particular example, for an employee form type, ISV 104 customizes the objects to include an additional field. This customization is represented by a first delta file stored in type store 216. Then, customer 108 customizes the employee form type to modify a label of the field. This customization is represented by a second delta file stored in type store 216. Both of the first and second delta files are stored, separately, in type delta store 238. Type store 216 stores information that associates or maps both of the first and second delta files with the corresponding employee form type, to which they apply, as well as information that defines an order in which the deltas were written. This information allows the deltas to be applied to the base employee type in base system 202 in the correct order.

By way of illustration, but not by limitation, storing a delta file for a given type separate from the underlying base XML file allows the corresponding customization of the type to be easily isolated from the base system as well as other layers of customization for the type. This can facilitate versioning of the deltas as well as physical separation of a customization from the base system (e.g., publishing the customization from a third party provider, such as a marketplace). For instance, ISV 104 can customize a type and provide the corresponding XML file for download from their own website, for example. Further, a developer may desire to remove a portion of proprietary information from the customized system 204 before it is provided to another party. To do so, the developer removes the corresponding XML file without having to further customize the system through customization tools 224 of environment 220.

To construct customized system 204, type accessing component 222 accesses the types and their corresponding deltas, which are stored as XML files in one example, from type store 216. Type accessing component 222 deserializes the base XML files and the delta XML files into corresponding object representations. Then, for each type that has at least one delta, a differencing/combining engine 240 of system 236 is utilized to put the base object and the delta object(s) for that type together to construct the corresponding customized type. Differencing/combining engine 240 understands the structure of the base object and the delta object to facilitate their combination.

After all customized types are constructed, the customized system 204 can be further developed within development environment or passed to runtime environment 206 (or other endpoint) for consumption. Examples of other endpoints include, but are not limited to, upgrade system 242 which facilitates upgrading the underlying base system 202 and lifecycle management system 244 which facilitates managing the customized system 204 once it is deployed. In one example, the runtime environment or other endpoint is unaware of the deltas. The endpoint simply consumes the application types within customized system 204.

FIG. 3-1 is a flow diagram of one example of a method 260 for generating a customized system. For sake of illustration, but not by limitation, method 260 will be described in the context of developer 218 using development environment 220 to develop customized system 204.

At step 262, developer inputs are detected to customized base system 202. For example, developer 218 can access customization tools 224 through user interface displays 230 to select base system 202 for customization. At step 264, type accessing component 222 accesses base system 202 from type store 216. For example, this can include deserializing the XML files for the various types modeled in base system 202. FIG. 3-2 illustrates one example of an XML file representation 261 of a base type (a table in the present example) that is retrieved from type store 216.

At step 266, a DSL modeling display can be displayed with user input mechanisms to receive user inputs that perform DSL modeling at step 268. An example of performing DSL modeling is described in further detail below.

At step 270, a type customization display is displayed with user input mechanisms. For example, customization tools 224 can be provided to developer 218 to customize the types modeled in base system 202. At step 272, user inputs are detected that perform customizations to one or more of the modeled types. For example, as mentioned above, a customization can comprise adding metadata or code to a given element type, deleting or changing properties to a given element type, or changing a hierarchical arrangement of the metadata elements for a given element type. Referring again to FIG. 3-2, one example change (i.e., changing an "original value" to a "changed value") is represented at reference number 263. These of course, are examples only.

At step 274, development environment 220 identifies the customizations as deltas or differences from the base system 202. In one example, difference generation system 236 is utilized to identify the deltas from the developer customizations.

Figure 4:
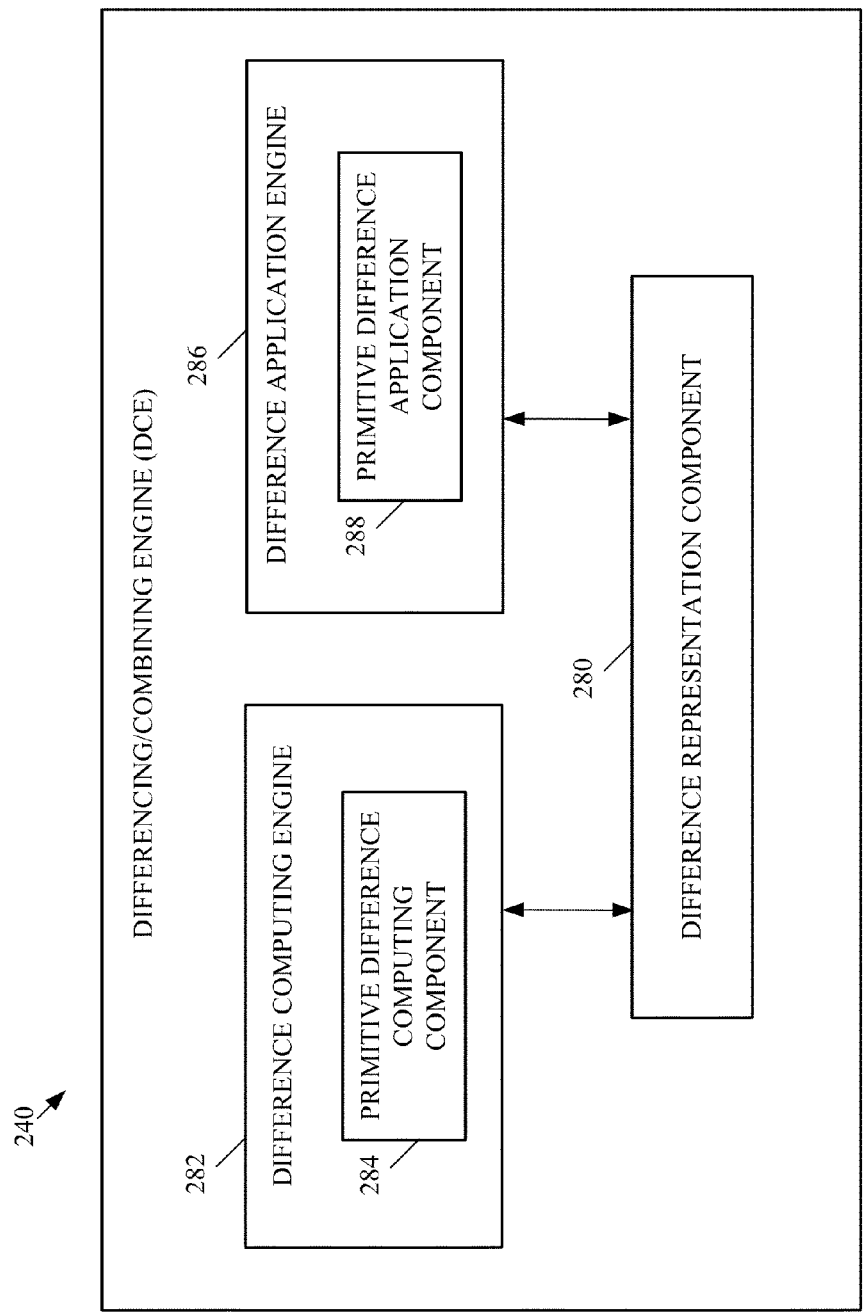
FIG. 4 is a block diagram of one example of a differencing/combining engine.

FIG. 4 illustrates one example of differencing/combining engine (DCE) 240 of difference generation system 236 that can be used at step 274. DCE 240 is configured to compute and construct the deltas between the original object and the customized object that is customized by the user inputs detected at step 272. DCE 240 includes a difference representation component 280 which comprises a mechanism for extracting the differences to compute the deltas and to apply the differences to the base system to construct the customized system 204.

Difference representation component 280 uses a difference computing engine 282. Difference computing engine 282, in one example, uses the object model that is inferred from the meta model to compute differences in the containment hierarchy. Difference computing engine 282 disassembles the type being customized into more basic or primitive components. By way of example, a primitive component comprises a constituent part (e.g., a string, an integer, an enumeration value) that makes up the base type. Each change to a type can be derived from a basic set of changes to the primitive components of the type.

A primitive difference computing component 284 identifies the individual primitive components and inspects each component individually to determine whether it has been changed, added, deleted, or otherwise customized. In one example, primitive difference computing component 284 compares the customized type against the base types in base system 202 to identify the differences.

Referring again to method 260, the delta that represents the differences between the customized type and the base type is generated as a separate file that is tied or otherwise associated with the base system at step 276. In one example, the meta model, which can be defined through DSL modeling system 235, defines the schema format for storing the base system types in type store 216, and the delta types are inferred from the base system types. In this manner, a framework is provided for defining the format of the XML files.

At step 278, the separate delta file is saved in type store 216 separate from base system 202. With respect to the example of FIG. 3-2, a delta file 265 is generated.

Figure 5:
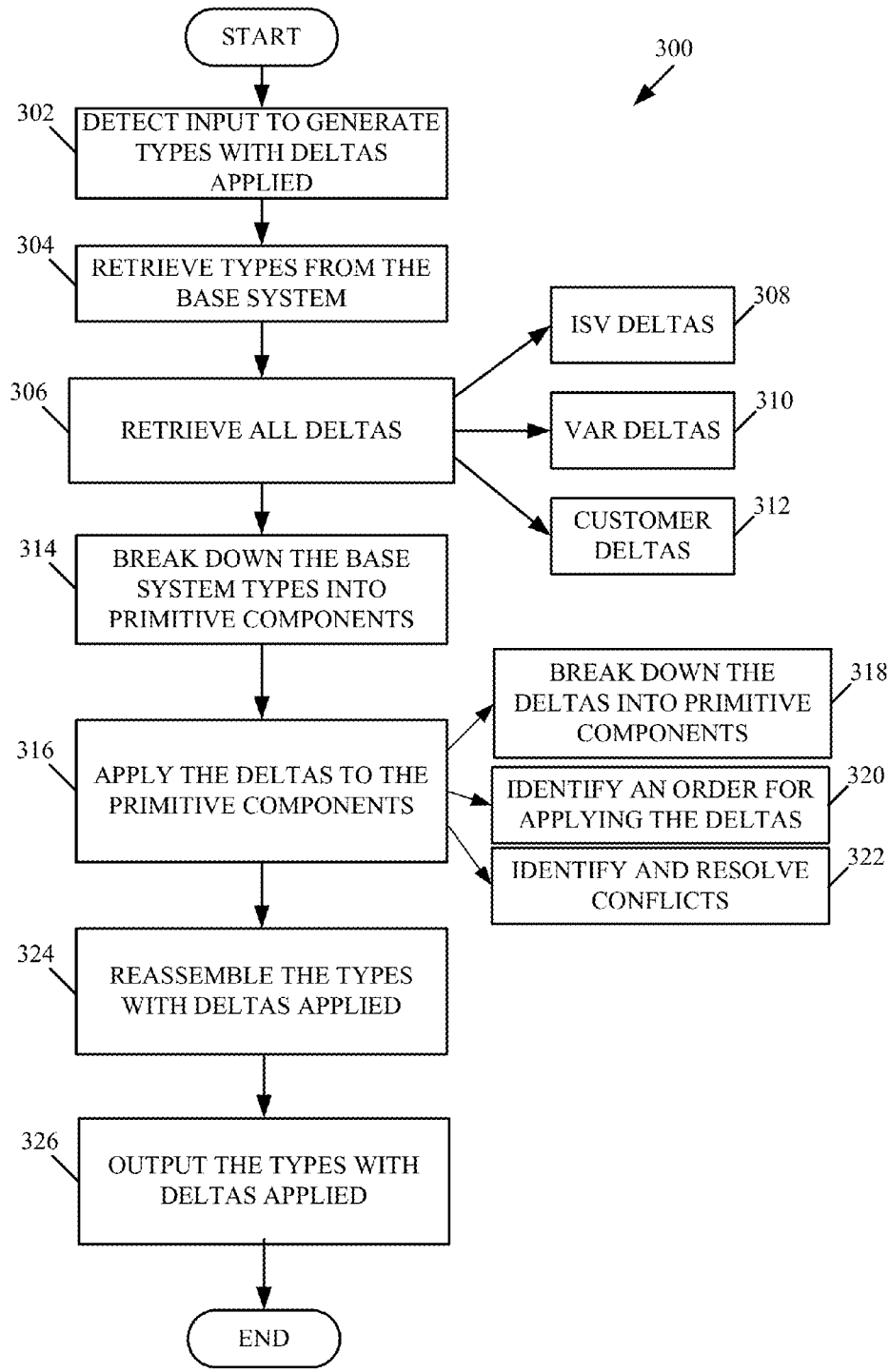
FIG. 5 is a flow diagram of one example of a method for constructing a customized system using stored deltas.

FIG. 5 is a flow diagram of one example of a method 300 for constructing a customized system using stored deltas. For example, method 300 can be performed at runtime to apply type deltas in type delta store 238 to base system 202 to construct customized system 204 that is run within runtime environment 206. In another example, method 300 can be performed to test the customized system 204 within a test environment or when customized system 204 is to be further customized within development environment 220 by developer 218. For the sake of illustration, but not by limitation, method 300 will be described in the context of development environment 220.

At step 302, an input is detected to generate types with the deltas applied. As mentioned above, this can include an indication that the customized system 204 is to be run within runtime environment 206. The types are retrieved from base system 202 at step 304. In one example, this includes type accessing component 222 serializing the XML file representations of the types from base system 202 into their physical representations within development environment 220.

At step 306, development environment 220 retrieves all of the deltas corresponding to the types retrieved at step 304. As mentioned above, there can be multiple different layers of customizations to the types. For example, the deltas retrieved at step 306 can include ISV deltas 308 (e.g., representing customizations made by ISV 104 in FIG. 1), VAR deltas 310 (e.g., representing customizations made by VAR 106 in FIG. 1), and customer deltas 312 (e.g., representing customizations made by customer 108 in FIG. 1).

At step 314, the base system types are broken down into their primitive components. For example, DCE 240 receives and disassembles the base system types. A difference application engine 286 (shown in FIG. 4) of DCE 240 applies the deltas to the primitive components at step 316. In one example, this includes difference application engine 286 breaking down the deltas into their primitive components at step 318 and then merging the primitive values of the base system and the deltas.

In one example, a primitive difference application component 288 (shown in FIG. 4) applies the deltas at the correct locations in the base type at the primitive component level. For example, but not by limitation, in one example a primitive component comprises a string as a property within the type. The delta can specify a new or customized value for this string. The primitive difference application component 288 applies the new value to this primitive component within the base type.

In one example, where there are multiple deltas applying to a given type, method 300 identifies an order for applying the deltas at step 320. The order of the deltas can be determined, in one example, from their corresponding XML representations that indicate when the corresponding customizations were made.

At step 322, customization analyzer and conflict detection system 248 of development environment 220 identifies and resolves conflicts that arise in a given type due to the application of the deltas to the base system types.

At step 324, development environment 220 reassembles the types with the deltas applied and outputs the types at step 326, for example for consumption at an end point such as runtime environment 206.

Development environment 220 provides a framework to apply customizations comprehensibly across an entire system for all types in a manner that is efficient, flexible, and requires less developer time. Conversely, in other types of systems the developer had to manually hand-code a given customization across many different types within the base system. Development environment 220 uses code generation to drive the framework implementation in a way that improves the customization architecture.

Referring again to FIG. 2, visualization system 246 is configured to generate visualizations to developer 218 to facilitate the development process. The visualization can identify, among other things, customizations made to various elements as well as conflicts that arise due to conflicting customizations.

For example, an ISV and a VAR may each customize a type in two different ways. The ISV may customize a label in a base type to one value and the VAR may customize the same label to a different value. Customization analyzer and conflict detection system 248 is configured to analyze the customizations made to base system 202 and to detect conflicts between the customizations. These conflicts can be resolved using conflict resolution system 250 that includes, in one example, an auto-resolution component 252 that is configured to automatically resolve some conflicts (e.g., using conflict resolution rules) and a conflict surfacing component 254 that is configured to surface conflicts for developer 218. Conflict resolution is discussed in further detail below.

Figure 6:
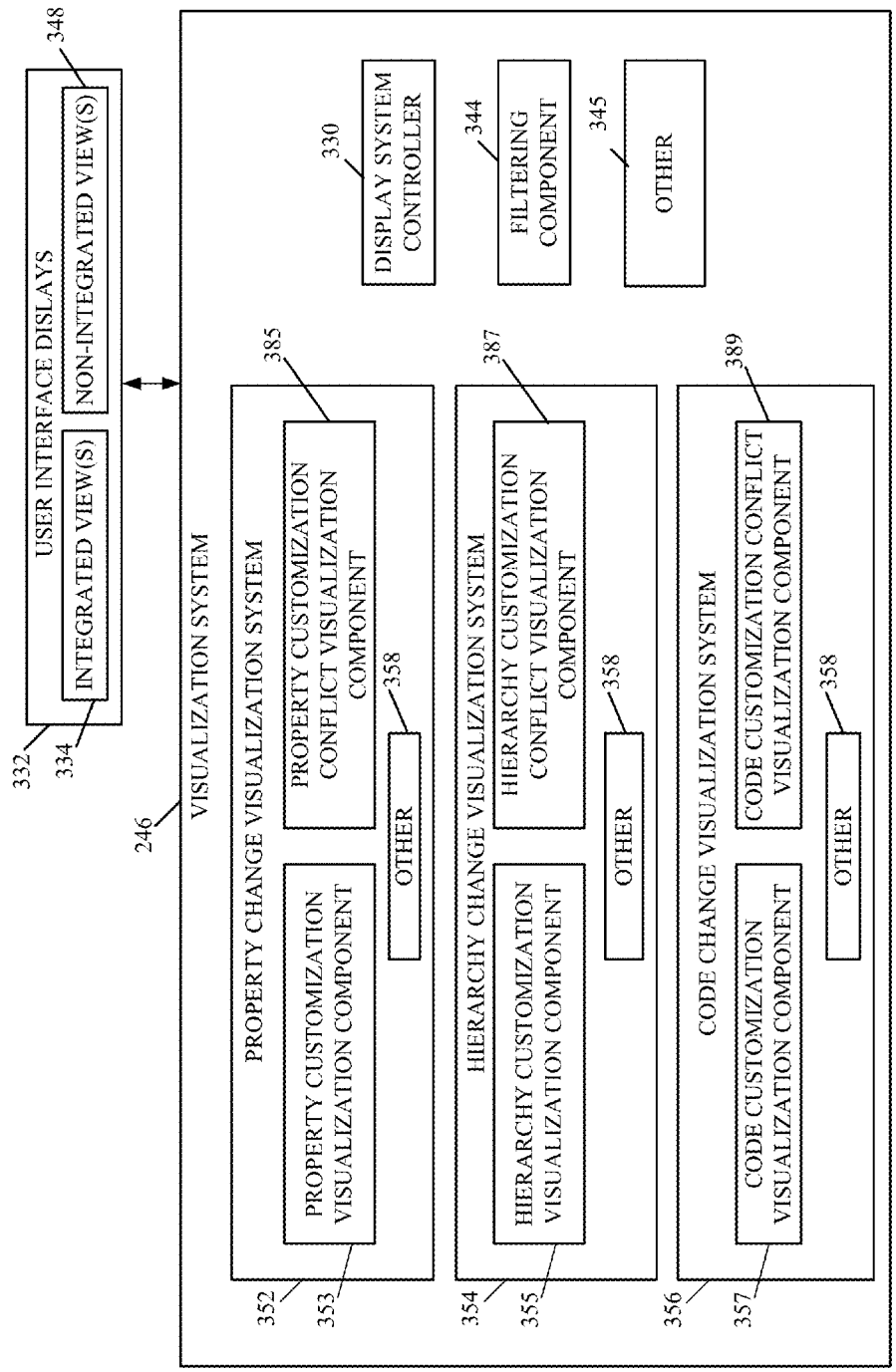
FIG. 6 illustrates one example of a visualization system.

FIG. 6 illustrates one example of visualization system 246. In the illustrated example, visualization system 246 includes a display system controller 330 that is configured to control display system 223 to generate user interface displays 332 using user interface component 225. In one example, user interface displays 332 are presented to developer 218 during customization of base system 202. For instance, user interface display 332 can be displayed at step 270 in method 260.

As shown in FIG. 6, one example user interface display 332 comprises an integrated visualization (or view) 334 which shows customizations as they have been applied over lower layers of customization. In other words, integrated view 334 shows developer 218 the entire system including the base objects and the customized objects. Through integrated view 334, developer 218 can visualize all of the elements that are customized as well as elements that are not customized. Further, the integrated view 334 can also visualize which elements have conflicts and which elements do not have conflicts.

Figures 1, 7:
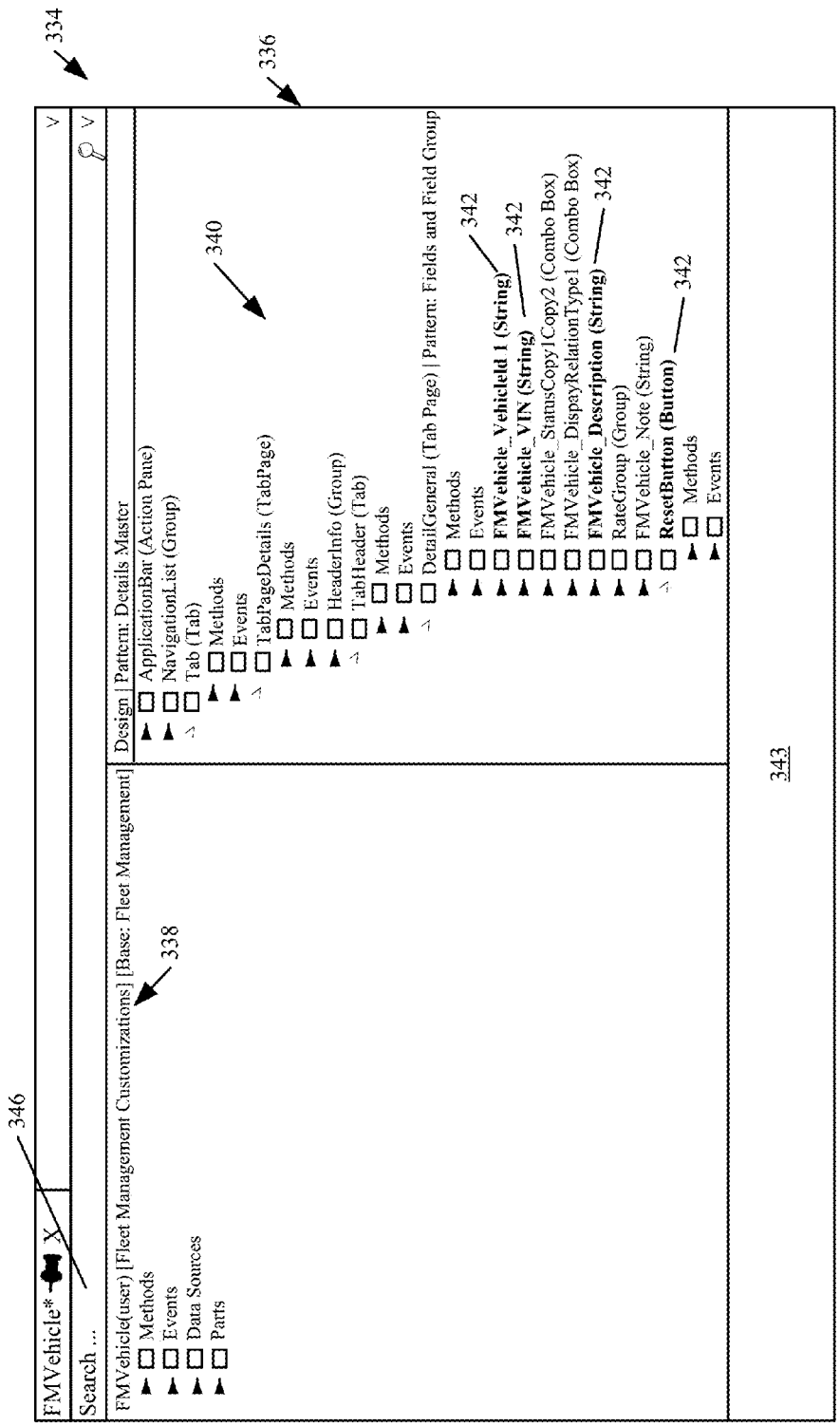
Figures 2, 7:
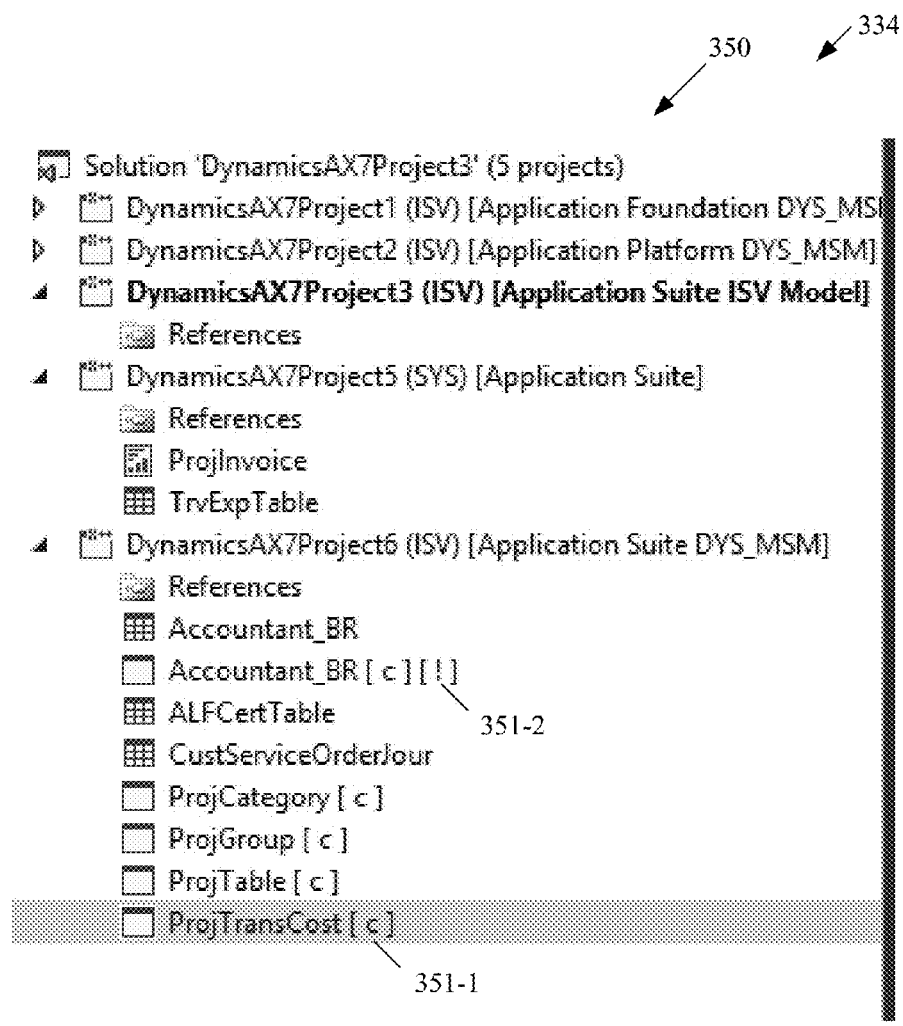

One example of an integrated view 334 is shown in FIG. 7-1. Integrated view 334 is illustratively a hierarchical tree structure having parent nodes and child nodes. Each child node depends from a corresponding parent node and is shown as being indented to the right relative to the corresponding parent node.

FIG. 7-1 provides a screen shot of a user interface 336 that displays an indication of the type being customized and a list of elements 340 for that type. The user interface 336 includes visual cues for developer 218 to understand what elements have been customized. In the illustrated example, the elements that have been customized are visually distinguished from the elements that have not been customized, for example by bolding the customized element (represented by reference numerals 342). The customizations can comprise changes made by the developer 218 in a current layer of customization, as well as changes made in lower layers of the customizations (e.g., previous customizations made by ISV 104 and/or VAR 106). Further, any of a variety of different types of customizations can be indicated. Some include, but are not limited to, property changes, addition of new elements, re-parenting of elements, and the changing of order of elements. Further, a code and/or metadata editor (not shown in FIG. 7-1) can also be provided with user interface 336. This can enable the developer 218 to make further customizations and to resolve conflicts in the customizations. In another example, user interface 336 can include a preview window 343 of the object. For example, where type 338 is a form, the preview window 343 can display a preview of the form.

Referring again to FIG. 6, visualization system 246 includes a filtering component 344 that filters the view based on a filtering input received from developer 218, for example in a search box 346 shown in FIG. 7-1. The filtering input can include keywords that are used to search the elements. The filtering input can also be used to switch from integrated view 334 to a non-integrated view 348 to view only elements that have been customized or only elements that have conflicts. This is discussed in further detail below. Visualization system 246 can include other items 345 as well.

FIG. 7-2 illustrates another example of an integrated view 334. FIG. 7-2 provides a screen shot of a user interface 350 indicating elements that have been customized and elements that have conflicts. As shown in user interface 350, elements that have been customized are provided with a visual indicator 351-1 ("[c]" in the present example) and elements that have conflicts are provided with a visual indicator 351-2 ("[!]" in the present example). Using these visual indicators, developer 218 can easily see which elements have been customized at a lower level of the customizations and/or have conflicts arising from the customizations.

Figure 8:
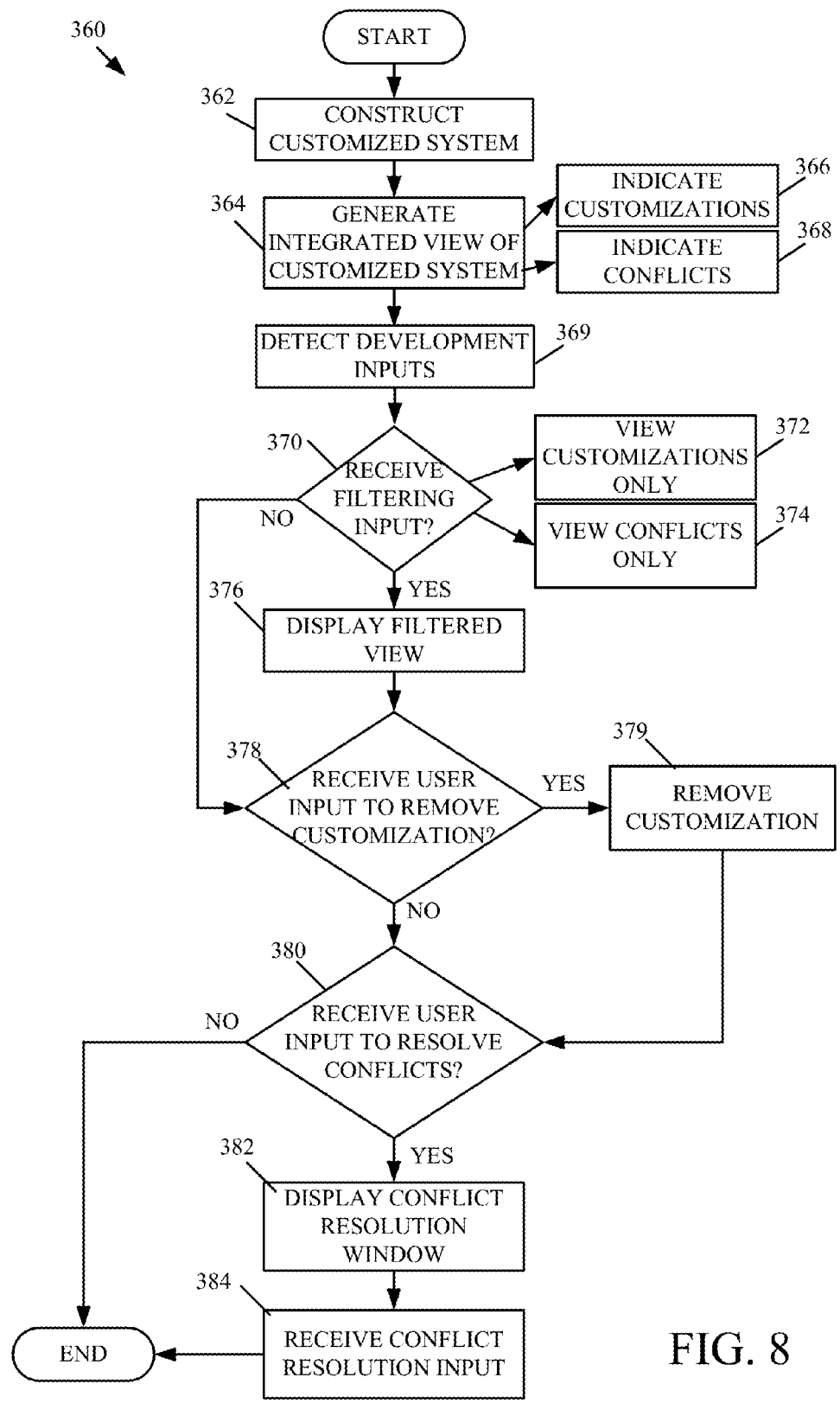
FIG. 8 is a flow diagram of one example of a method for visualizing customizations and conflicts to a developer.
Figures 1, 8:
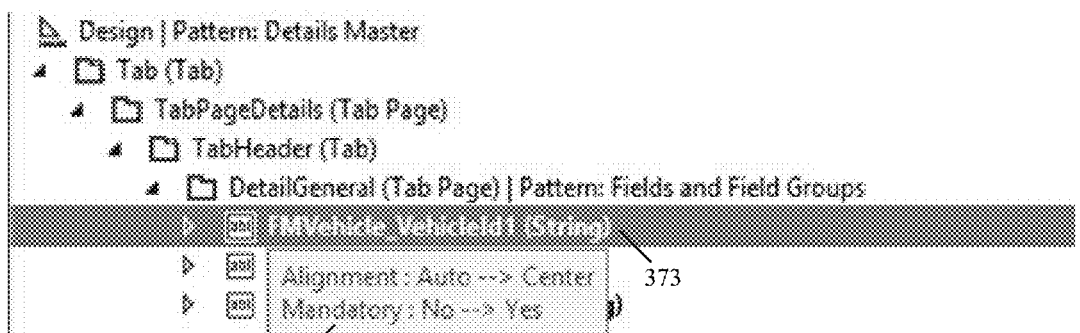
FIG. 1 is a block diagram of one example of a development channel.
Figures 2, 8:
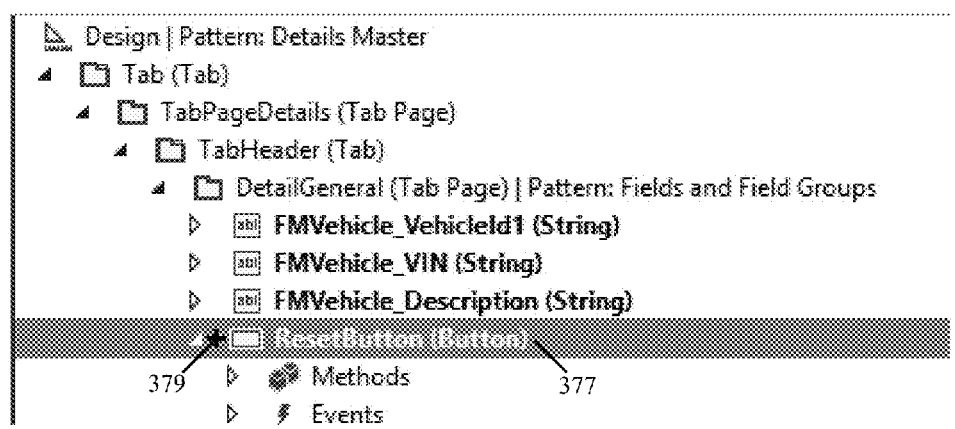
Figures 3, 8:
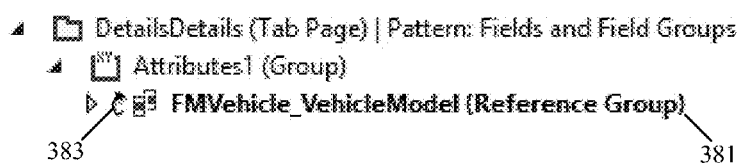
Figures 4, 8:
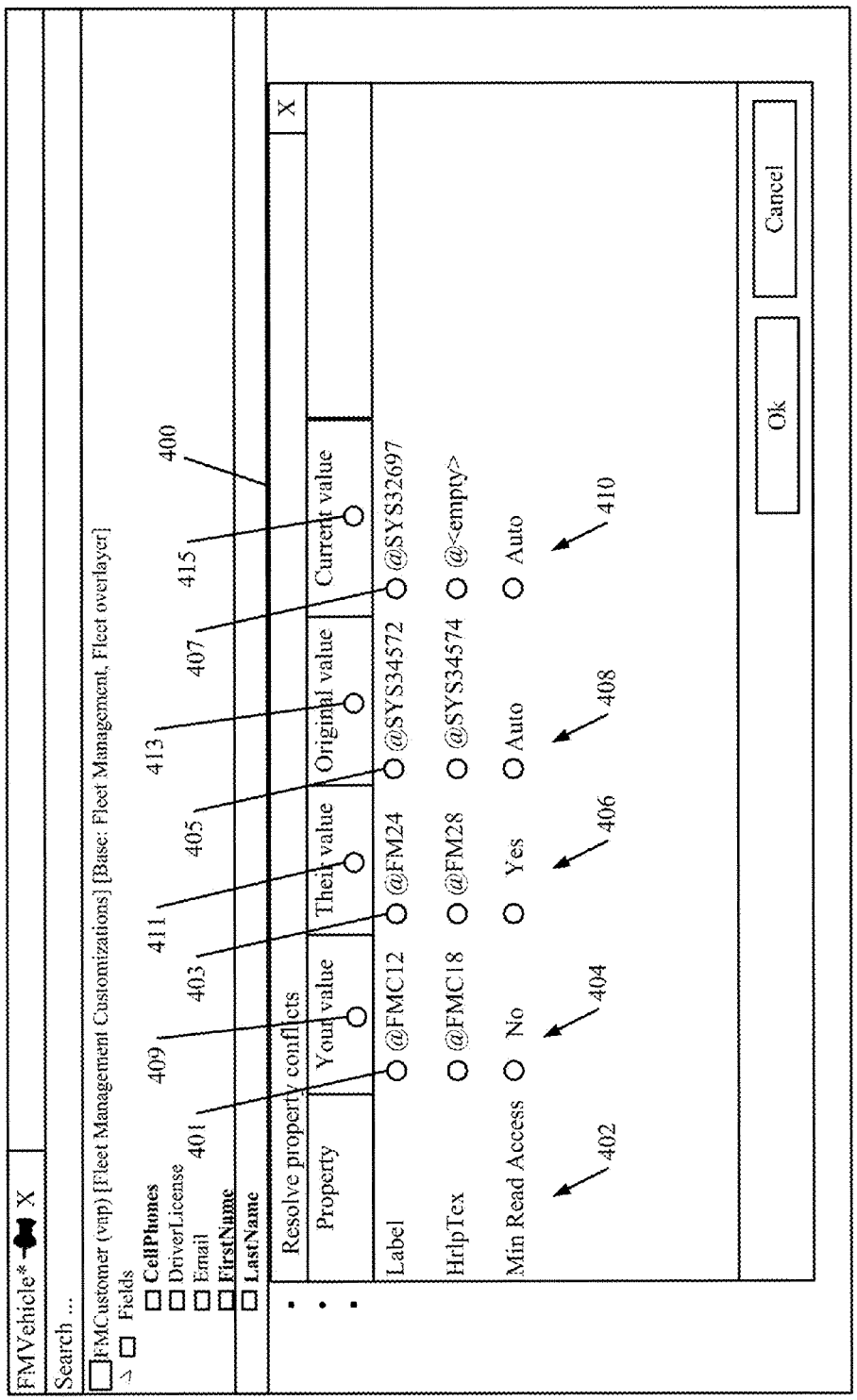
Figures 5, 8:
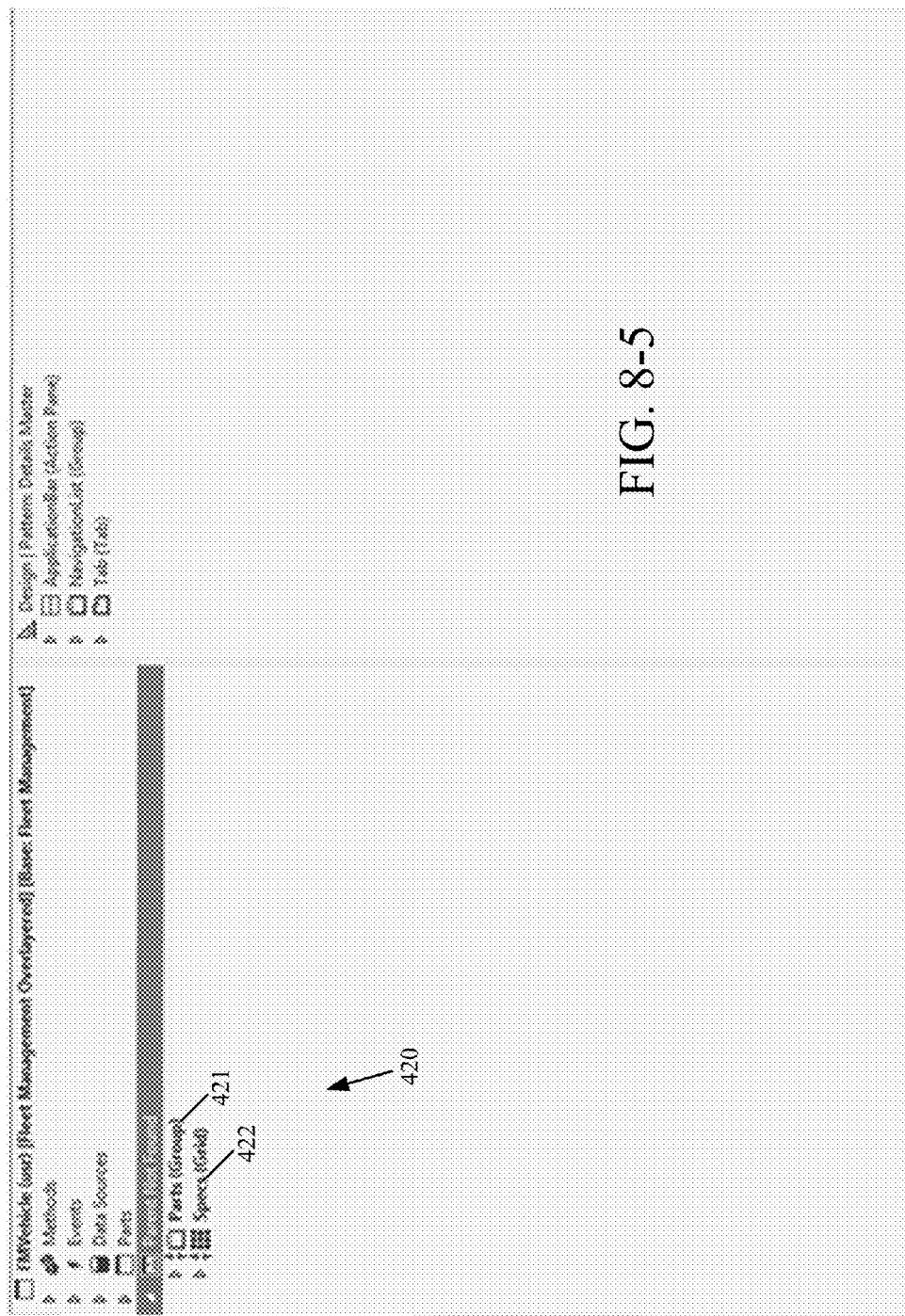
Figures 6, 8:
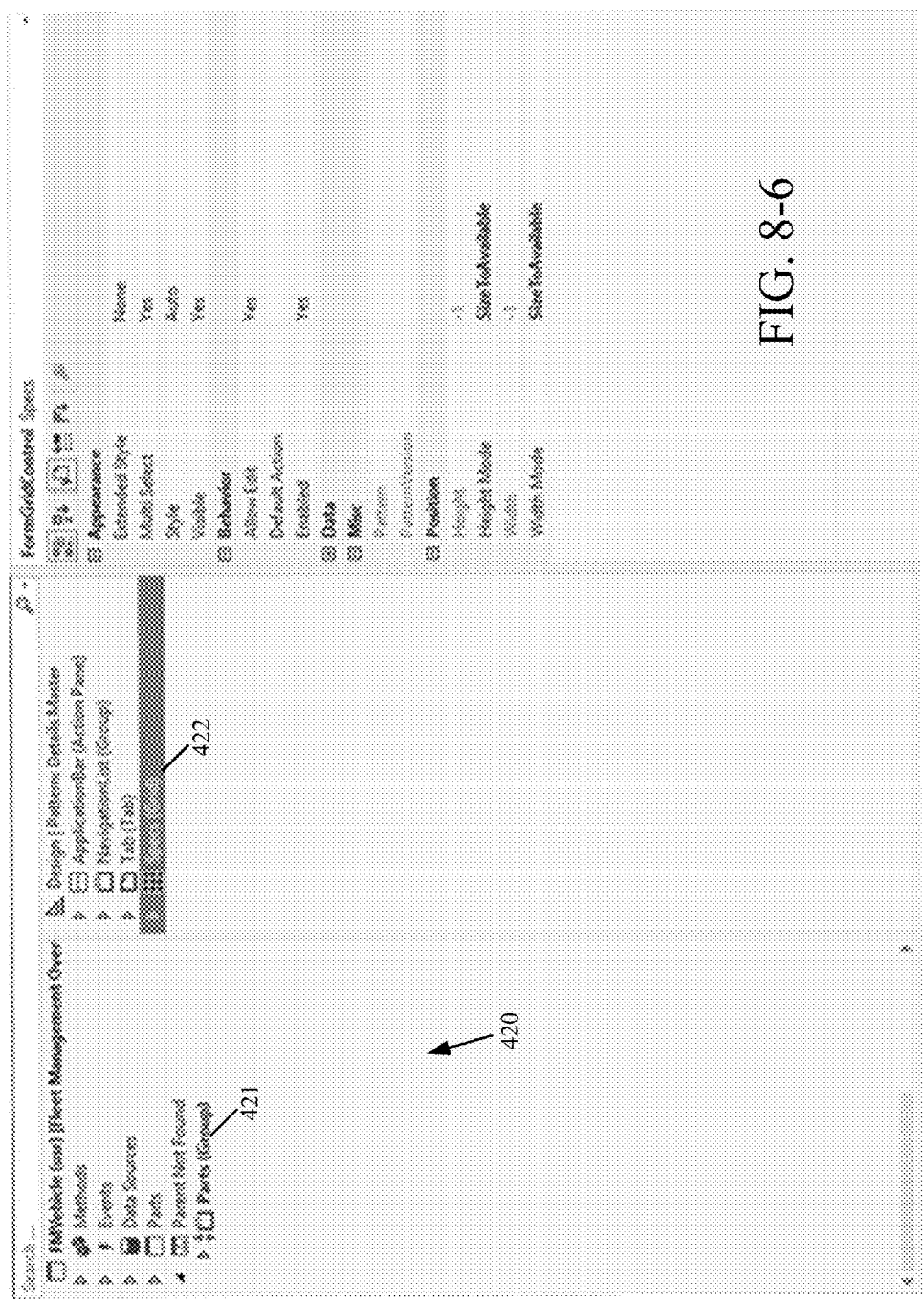

FIG. 8 illustrates one example of a method 360 for visualizing customizations and conflicts to a developer. For the sake of illustration, but not by limitation, method 360 will be described in the context of visualization system 246 of development environment 220.

At step 362, customized system 204 is constructed by applying type deltas in store 238 to base system 202. At step 364, an integrated view 334 is generated to visualize the customized system to developer 218. Integrated view 334 visually indicates customizations at block 366 and conflicts at 368.

In one example, FIGS. 8-1, 8-2 and 8-3 illustrate elements that have been customized in different ways. FIG. 8-1 illustrates a property change customization. Specifically, one or more properties of element 373 have been changed to new values. Element 373 is visualized by bolding the element's name. Further, the change properties can be displayed in a popup window 375, for example when the user hovers a cursor over and/or selects element 373. Window 375 visualizes the changed properties.

FIG. 8-2 illustrates a customization in which a new element 377 is added. This customization can be visualized by bolding element 377 and/or using a visual indicator 379 (a "+" sign in the present example). Use of visual indicator 379 visually differentiates the new element customization in FIG. 8-2 from the property change customization in FIG. 8-1.

FIG. 8-3 illustrates a re-parented element customization in which an element 381 has been moved to a new parent element. This customization can be indicated by bolding element 381 and/or providing a visual indicator 383 (an arrow in the present example) indicating that the customization is a re-parenting of the element. In this manner, indicator 383 visually differentiates the type customization in FIG. 8-3 from the customizations in FIGS. 8-1 and 8-2.

In the example illustrated in FIG. 6, in order to identify and visualize the various types of customizations and conflicts at step 368, visualization system 246 includes a property change visualization system 352, a hierarchy change visualization system 354, and a code change visualization system 356. Property change visualization system 352 includes a property customization visualization component 353 that visualizes property customizations and a property customization conflict visualization component 385 that visualizes property customization conflicts. Hierarchy change visualization system 354 includes a hierarchy customization visualization component 355 that visualizes hierarchy customizations and a hierarchy customization conflict visualization component 387 configured to visualize hierarchy customization conflicts. Code change visualization system 356 includes a code customization visualization component 357 that visualizes code customizations and a code customization conflict visualization component 389 configured to visualize code customization conflicts. Each of systems 352, 354 and 356 can include other components 358 as well.

Referring again to FIG. 8, in one example, developer 218 can further develop on the system through the integrated view. At step 369, development inputs are detected to customize an element displayed in the integrated view. For instance, developer 218, from the integrated view, selects a given model element to customize or extend, and then provides development inputs to customize or extend metadata and/or code associated with the selected model element.

In one example, the customizations that can be made by developer 218 are restricted or limited based on the customization layers. As mentioned above, in example step 362 the customized system is constructed for developer 218 to view and develop the system at a current customization layer, with the view showing changes made at lower layers of customizations (e.g., elements added or changed at a lower customization layer, etc.). At step 369, the development by developer 218 is restricted so as to not allow developer 218 to delete or rename an element added at a lower customization layer. This, of course, is one example only.

In one example of step 369 in which a code editor is present to developer 218 to edit code, developer 218 provides inputs to change an order of methods within the code editor. Although the order of the methods in the code editor may not impact the runtime environment, it may play a significant role in how developer 218 organizes and visualizes their code. As such, in one example, development environment 220 stores the reordered methods for subsequent presentation to developer 218. For example, a delta can be generated and stored to reflect the new method order.

At block 370, a filtering input is received from the developer to filter integrated view 334 to a desired non-integrated view 348. Examples include a customization filtering input (such as "[c]") to view customizations only at block 372 or a conflict filtering input (such as "[!]") to view conflicts only at block 374. The filtered non-integrated view 348 is displayed at step 376.

In the case of filtering the view to show customizations, visualization system 246 employs property customization visualization component 353, hierarchy customization visualization component 355, and code customization visualization component 357. In the case of filtering the view to show conflicts, visualization system 246 employs property customization conflict visualization component 385, hierarchy customization conflict visualization component 387, and code customization conflict visualization component 389.

At step 378, a user input is received to remove a customization from the object. For example, through the integrated view displayed at step 364 or the filtered view displayed at step 376, developer 218 can right click or otherwise select one of the customized elements, and then indicate that the customization should be removed (e.g., select a remove customization menu item).

At step 380, a user input is received to resolve a conflict. For example, through the integrated view displayed at step 364 or the filtered view displayed at step 376, developer 218 can right click or otherwise select one of the customized elements. Then, at step 382, a conflict resolution window is displayed to the user. At step 384, a conflict resolution input is detected and the customization conflict is resolved based on the input.

One example of a conflict resolution window 400 is illustrated in FIG. 8-4. As illustrated in FIG. 8-4, conflict resolution window 400 displays a list 402 of properties that have conflicts for the selected element (i.e., element "Last-Name" in the present example), and lists 404, 406, 408, and 410 of conflicting values for the properties in list 402. For example, for each conflicted property in list 402, window 400 displays a "current value" in list 410 for the property along with one or more other values that give rise to the conflict. By way of example, these other values include a value in list 404 that is assigned to the property by developer 218 (i.e., "your value", which could be the same as or different than the current value), an "original value" in list 408 from the base system 202, and a value in list 406 from another layer of customization (i.e., "their value"). For example, where developer 218 is part of customer 108, "their value" in list 406 can be a customization that was made by ISV 104 or VAR 106 shown in FIG. 1.

Conflict resolution window 400 also includes a plurality of user input mechanisms that allows developer 218 to select the value they desire for each property in list 402, to resolve the conflict. In the example of FIG. 8-4, each value in lists 404, 406, 408, 410 has a corresponding option button 401, 403, 405, 407 (or other user input mechanisms) that allows the user to select the value for the property in list 402. Also, in one example, a set of user input mechanisms 409, 411, 413, 415 are provided for developer 218 to select all of the values in the corresponding list 406, 410, 408, 404. Once the conflict has been resolved, the conflict icon within the integrated view is removed as there is no longer a conflict for that element.

Referring again to FIG. 8, in another example, step 382 is utilized to resolve hierarchy change conflicts visualized by component 387. To illustrate, FIG. 8-5 shows a user interface 420 that visualizes hierarchy customization conflicts where nodes 422 do not have a parent node. By way of example, this can occur due to an update to the base system that removes a particular node that previously had one or more dependent child nodes. In one example, the unparented nodes 422 are not editable until they are properly parented to a valid parent node. FIG. 8-6 illustrates user interface 420 in which node 422 has been re-parented to a proper parent node (for example by the developer 218 dragging node 422 within user interface 420). This removes node 422 from the list of hierarchy conflicts. Node 422 is now editable from user interface 420.

In the context of a code customization conflict visualized by component 389, step 382 displays the conflicting code in a conflict resolution window. Each portion of code is provided with a control that allows developer 218 to select that portion of code to resolve the conflict. This can be done in a manner similar to conflict resolution window 400 shown in FIG. 8-4.

Visualization system 246 provides an integrated visual and design experience for modeling customizations along with multiple visual cues to distinguish the actual customizations. The developer can easily switch between different user interfaces, such as an integrated view and a non-integrated view, that provides views of the customized system. This enhances the user experience and provides for a more efficient development environment.

Referring again to FIG. 2, in one embodiment lifecycle management system 244 is accessible by development environment 220 and includes services that can be used by developer 218 to identify, track, and resolve issues that arise during various lifecycles of a project. For instance, lifecycle management system 244 allows developer 218 to track issues which arise during customization of base system 202. The services of lifecycle management system allow a user to identify the needs of an organization and functionality that is provided with a system and generate or identify functionality or customizations that need to be made to the system in order to meet the needs of the customer that is deploying the system.

The services can include, for example, a diagnostic service that allows lifecycle management system 244 to identify particular environmental information that defines the environment of the deployed system. For instance, lifecycle management system 244 can receive information regarding runtime environment 206 from reporting and management system 258.

Lifecycle management system 244 provides integrated tools for reporting, project management (e.g., gathering estimates), costs of upgrades and conflict resolutions, and producing a timeline accounting for dependencies. These integrated tools help the developer understand the transformations being made, and plan for and execute the remaining tasks of the upgrade. Further, this provides a predictable experience on the part of the developer.

For instance, lifecycle management system 244 include tools that a developer 218 uses in performing various tasks within a project. For example, lifecycle management system 244 can walk the developer 218 through a work breakdown structure of a particular set of tasks pertaining to development of the customized system 204.

In one example, lifecycle management system 244 includes an upgrade service 256 that facilitates upgrades to the system. Upgrade service 256 can provide, in one example, cloud-based metrics pertaining to upgrading the base system 202. For example, developer 218 can upload their metadata and code to lifecycle management system 244 which analyzes the metadata in code and provide various metrics pertaining to whether to upgrade the system and how long it is expected to take. Further, lifecycle management system 244 can provide a series of user interface displays that walk the developer 218 through the upgrade process. Lifecycle management system 244 identifies what resources for the upgrade task are required. The use of lifecycle management system improves the user experience and reduces processing time and bandwidth for the upgrade process.

By way of example, FIGS. 9-1, 9-2, and 9-3 illustrate example user interfaces provided by lifecycle management system 244 during a solution migration process. One example is an update of a current base system 202. The interface 430 is displayed for an upgrade analysis performed on the current base system. For example, developer 218 has uploaded the current system to lifecycle management system 244 which analyzes the system to identify various tasks that need to be completed during the update process. This can be provided in the form of viewable records or files 432.

Figures 1, 9:
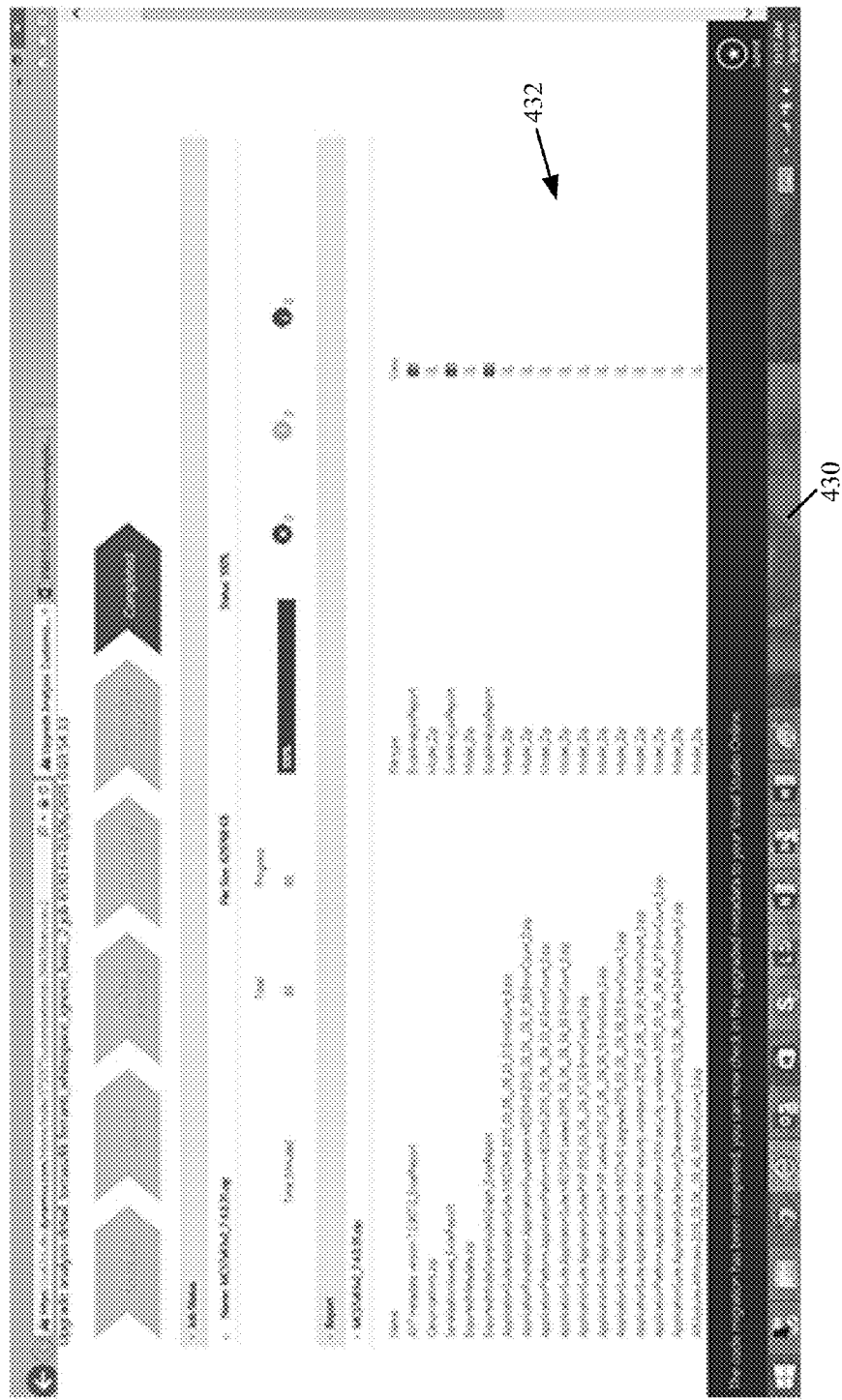
Figures 2, 9:
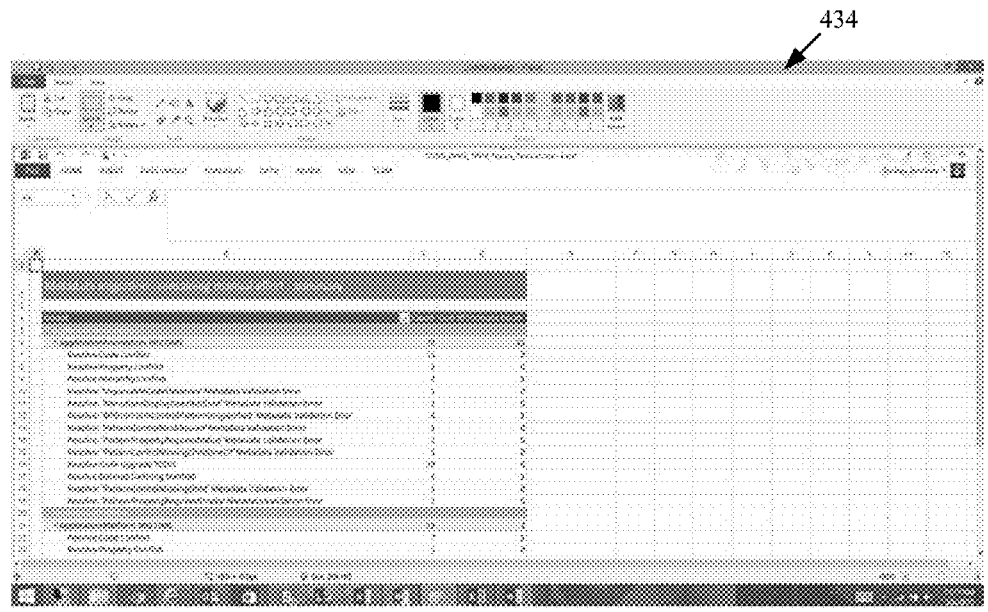
Figures 3, 9:
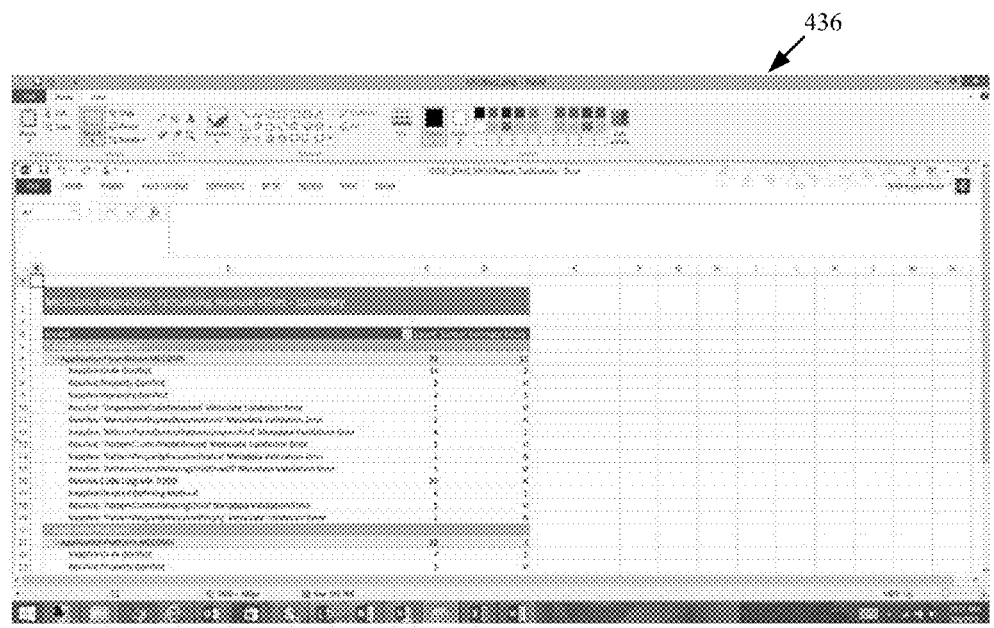

User interface 434 illustrated in FIG. 9-2 provides a report summary of the upgrade in terms of manual effort required by the developer or other persons involved in the upgrade process. For example, the report summary is broken down in terms of the different models 210 within base system 202 with a corresponding time estimate for how long various tasks will take. FIG. 9-3 provides a user interface 436 that breaks down the specific steps and tasks and provides a work breakdown structure at a more granular level.

Figure 10:
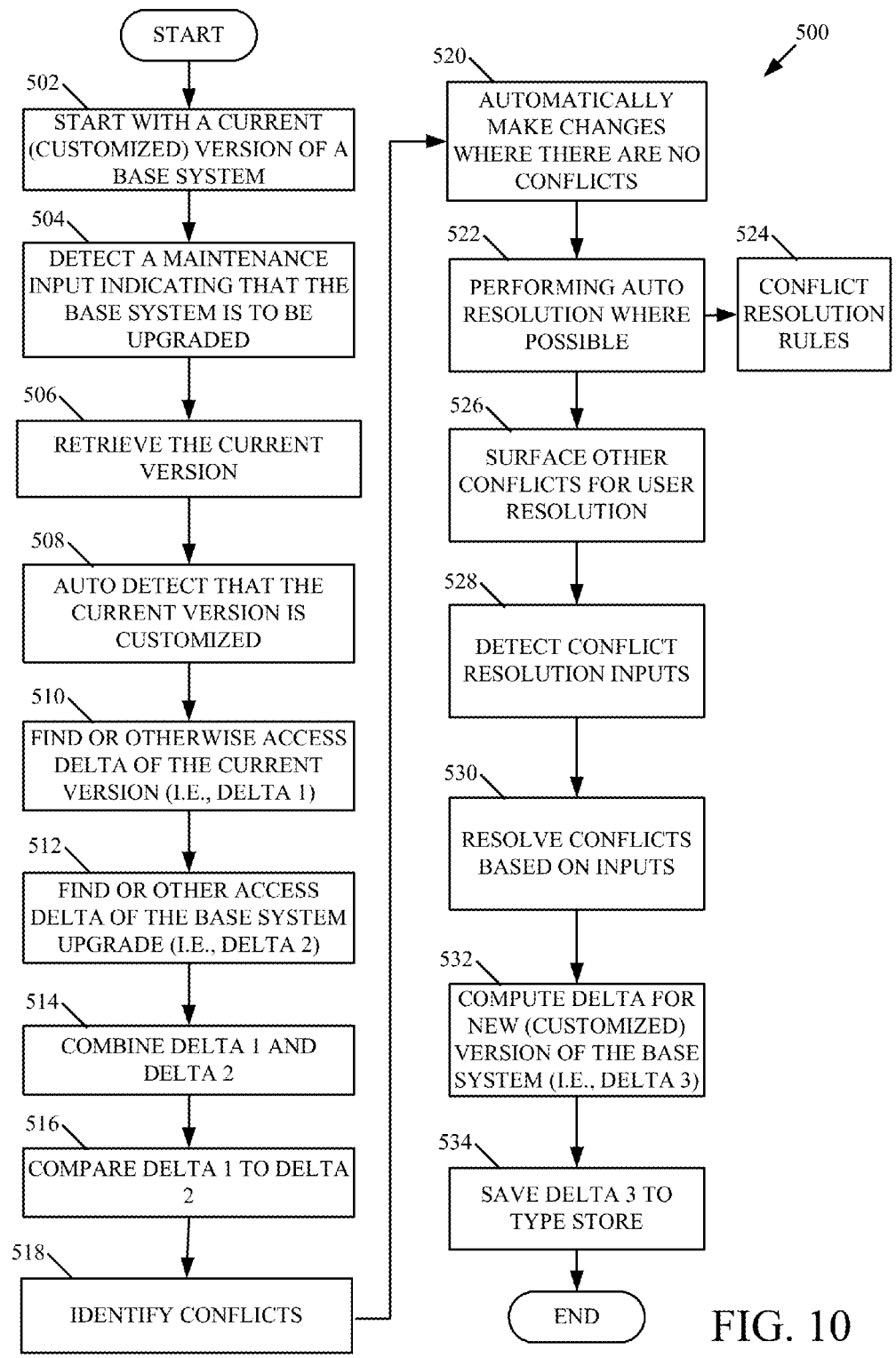
FIG. 10 is a flow diagram of one example of a method for upgrading a base system.

FIG. 10 illustrates one example of a method 500 for upgrading a base system. For the sake of illustration, but not by limitation, method 500 will be described in the context of architecture 200 illustrated in FIG. 2.

At step 502, the method starts with a current, customized version of base system 202. For example, base system 202 is stored in type store 216 along with type deltas in store 238 that define customizations to the base system.

At step 504, a maintenance input indicating that the base system is to be upgraded is detected. For example, the maintenance input can comprise an input from developer 218 initiating an upgrade process. In another example, the maintenance input can be received from another system, such as lifecycle management system 244.

For sake of the present discussion, the base system 202 will be referred to as "version A" upon which customizations have been defined for a customized system 204 (referred to as "version A'"). The base system is to be upgraded to a new version (i.e., "version B". Developer 218 desires that the customizations be carried over to the upgraded version to form a customized version of the upgraded system (referred to as "version B'").

At step 506, the current version A' is retrieved. At step 508. The method automatically detects that version A' is customized. For example, difference generation system 236 applies the meta model, that defines the type system framework within development environment 220, to inspect objects of the current version to determine what customizations have been made to the objects.

At step 510, the delta of the current version (referred to as "delta 1") is found or otherwise accessed. For example, the deltas can be retrieved from type store 216 or can be computed by difference generation system 236.

At step 512, the delta of the base system upgrade (referred to as "delta 2") is found or otherwise accessed. For example, lifecycle management system 244 can provide an indication of the differences between version A and version B. In another example, lifecycle management system 244 can provide the entire upgraded base system (version B) to development environment 220, which uses difference generation system 236 to compute delta 2 between version A and version B.

At step 514, the method combines delta 1 (the changes from version A to version A') and delta 2 (the differences between version A and version B).

At step 516, the method compares delta 1 and delta 2 and identifies any conflicts at step 518. At step 518, the method determines any conflicts between delta 1 and delta 2, for example using customization analyzer and conflict detection system 248.

At step 520, the method automatically makes changes to the system where there are no conflicts. In one example, this can include making transformations needed to accommodate changes between version A and version B including, but not limited to, changing names and calling conventions for application programming interfaces, applying refactoring of the customizations through standard patterns and deriving new types based on the customizations.

At step 522, method 500 performs automatic conflict resolution for conflicts that do not require user input. For example, auto-resolution component 252 of conflict resolution system 250 is utilized to apply conflict resolution rules 524. For example, step 522 can use conflict resolution rules 524 that include algorithms for conflict resolution. One example of a conflict resolution rule comprises a change to an underlying system API. The conflict resolution rule finds the old references to the API and replaces them with new references. In another example of a conflict resolution rule, a customization to version A added text to a user interface but, in version B, some of the UI concepts no longer apply. In this example, the conflict resolution rule can dissemble the previous UI customization and reassemble into a new UI definition in version B.

At step 526, conflicts that are not resolved at step 522 are surfaced for user resolution. For example, the conflicts can be surfaced using conflict surfacing component 254 of conflict resolution system 250. Step 526 provides any suitable user interface that allows the user to resolve the conflict. In one example, a user interface similar to FIG. 8-4 is provided. In any case, conflict resolution inputs are detected at step 528 and used to resolve the conflicts at step 530.

At step 532, a delta is computed for the new, customized version B' (i.e., delta 3). In one example, this is performed by difference generation system 236. The computed delta 3 is saved to type store 216 at step 534.

In the illustrated example of method 500, many if not all of the steps are performed by development environment 220. In another example, some or all of the steps can be performed by a cloud-based lifecycle management system (i.e., system 244). For example, lifecycle management system 244 can find the deltas at step 510 and 512, combine and compare the deltas at steps 514 and 516, and identify and resolve conflicts at 518 and 522. This of course, is one example of how method 500 can be implemented within architecture 200.

Figure 11A:
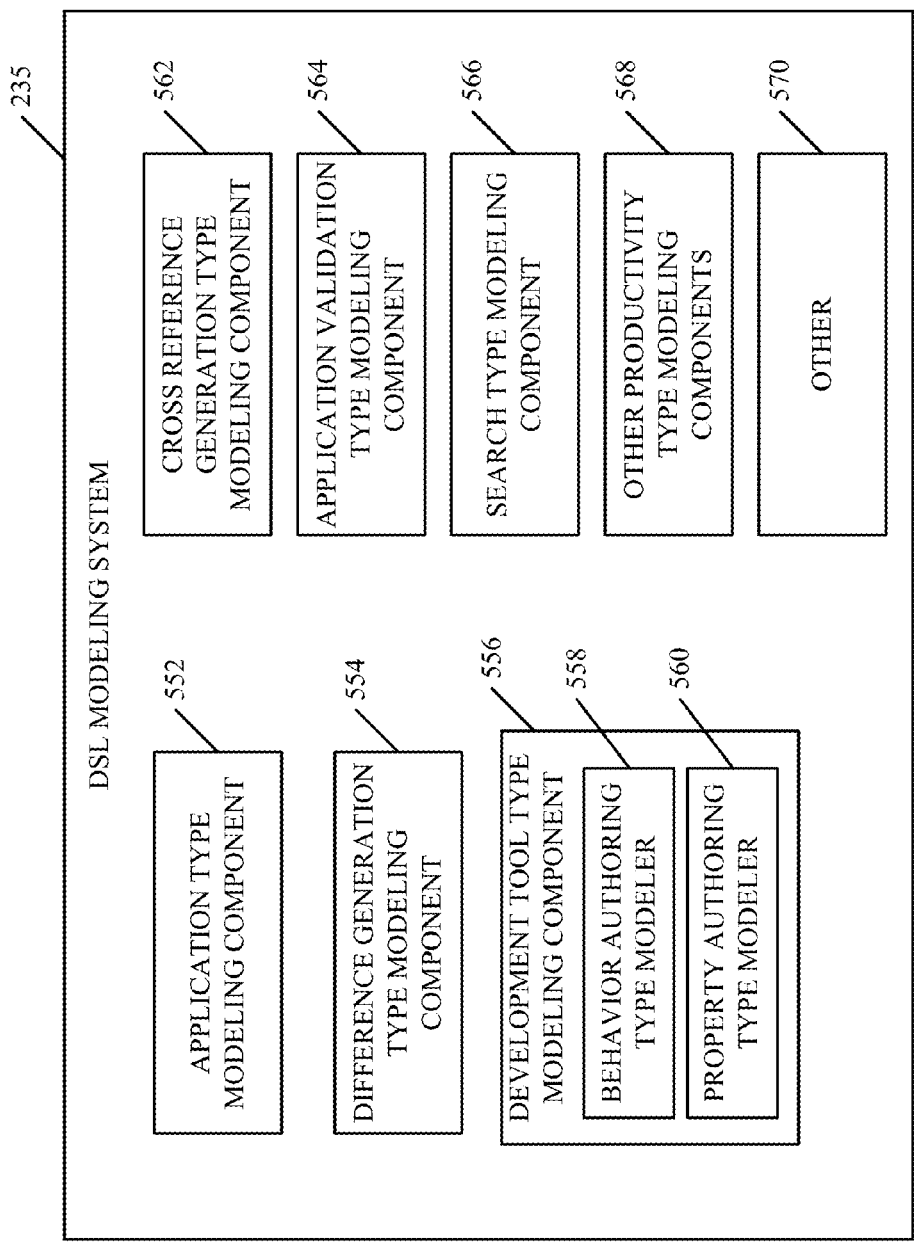
FIG. 11A is a block diagram of one example of a DSL modeling system.
Figure 11B:
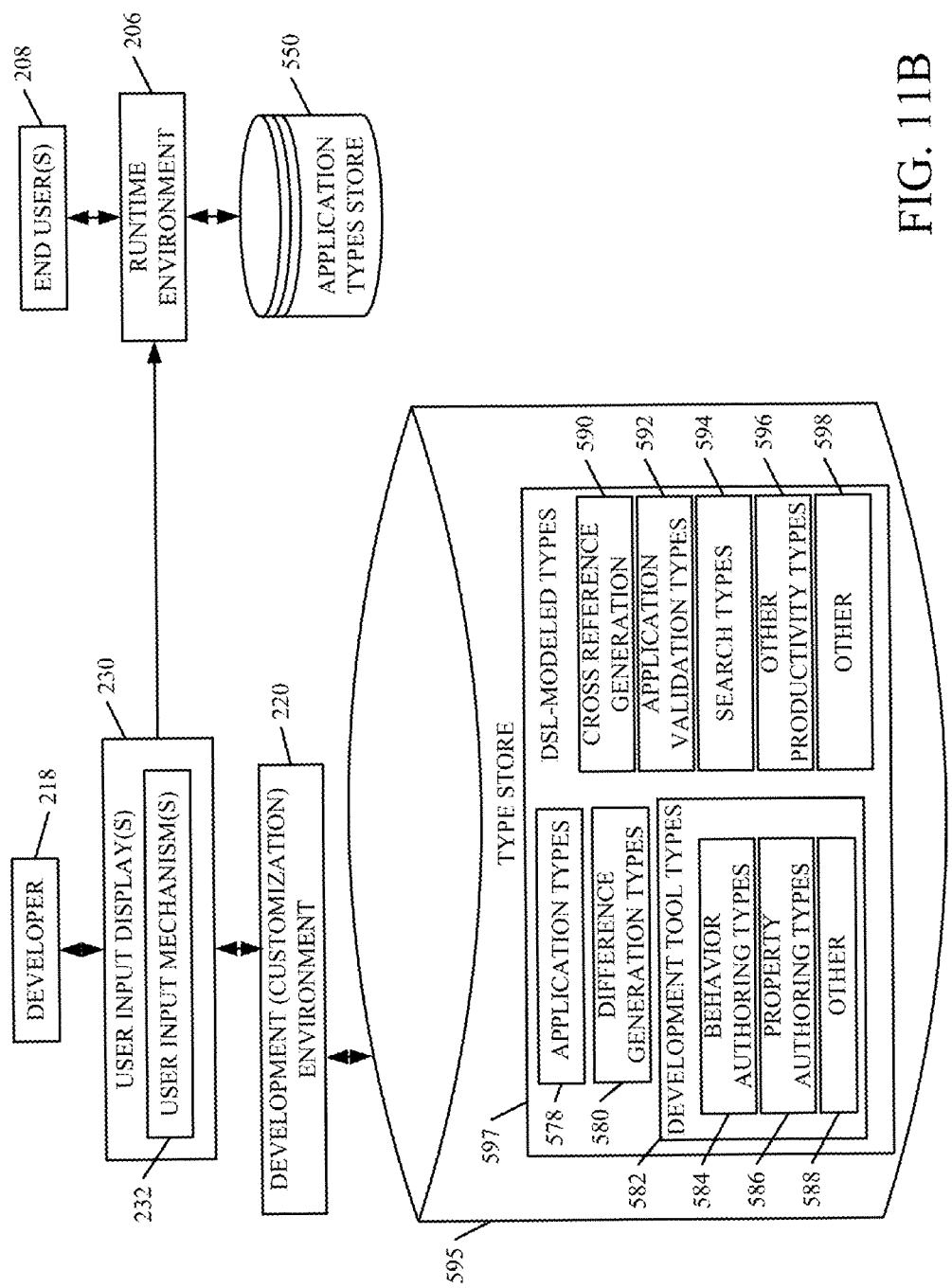
FIG. 11B is one example of a portion of the architecture shown in FIG. 2, illustrating a type store, in more detail.
Figure 11C:
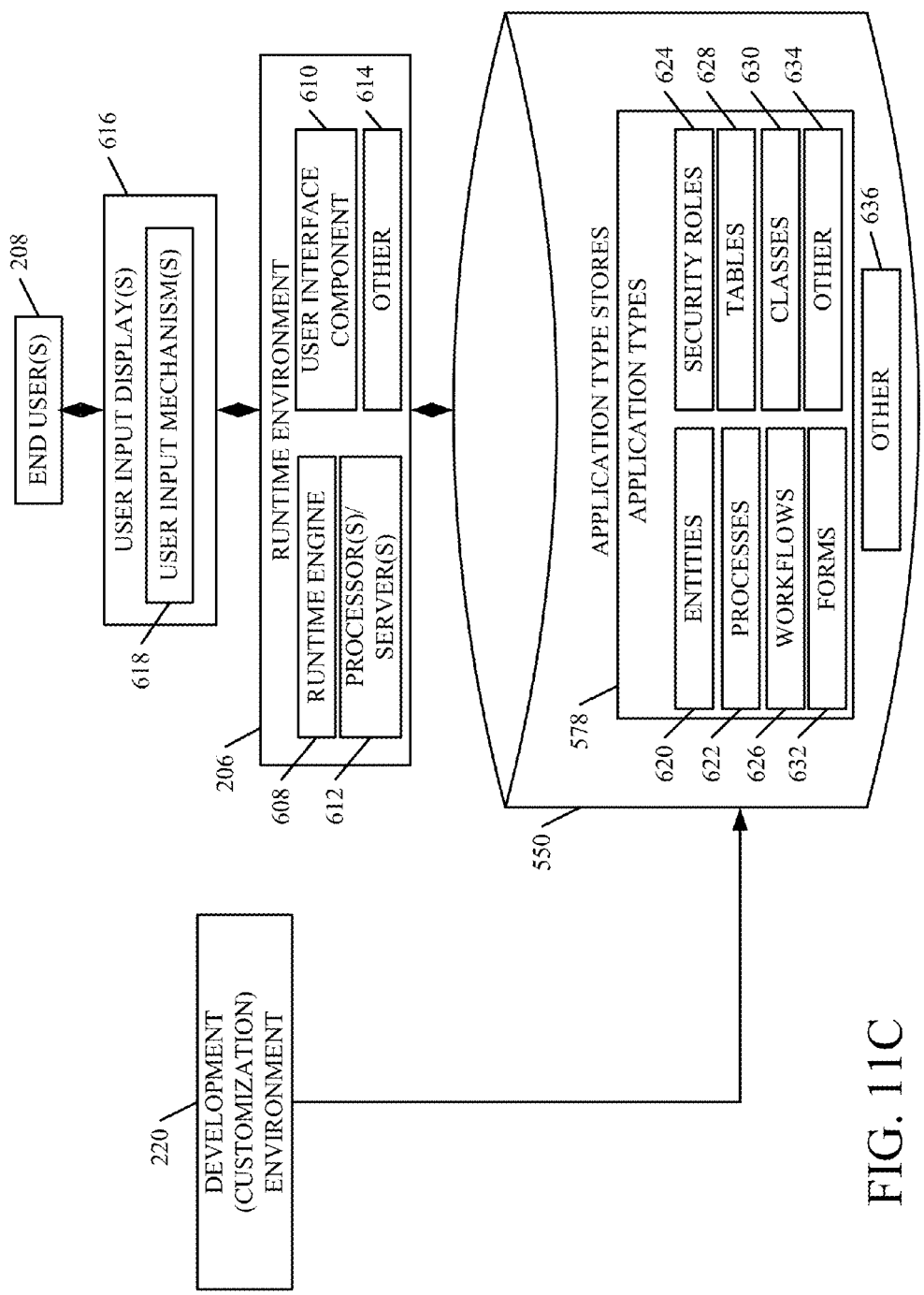
FIG. 11C is a block diagram of a portion of the architecture shown in FIG. 2, illustrating an application type store and runtime environment in more detail.
Figure 11D:
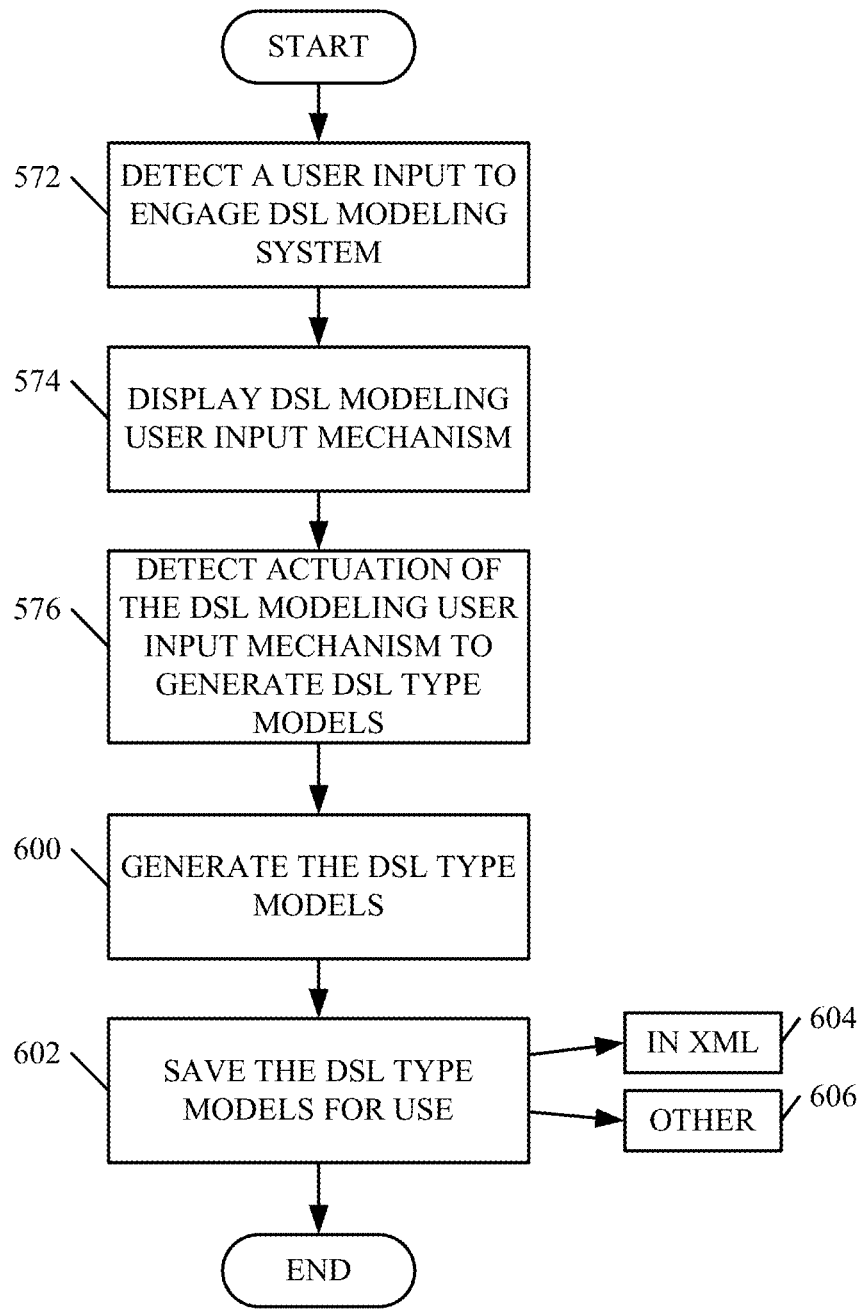
FIG. 11D is a flow diagram illustrating one example of the operation of the DSL modeling system shown in FIG. 11A.

FIG. 11A is a more detailed block diagram of one example of DSL modeling system 235 in more detail. FIG. 11B illustrates DSL-modeled types that can be used by development environment 220, in more detail, and FIG. 11C illustrates one example of runtime environment 206 and application types in an application type store 550 that can form a part of type store 216, or can be separate. FIG. 11D shows one example of the operation of DSL modeling system 235 in more detail. FIGS. 11A-11D will now be described in conjunction with one another.

In the example shown in FIG. 11A, DSL modeling system 235 illustratively includes application type modeling component 552, difference generation type modeling component 554, development tool type modeling component 556 (which, itself, can include behavior authoring type modeler 558 and property authoring type modeler 560), cross reference generation type modeling component 562, application validation type modeling component 564, search type modeling component 566, other productivity type modeling components 568, and it can include other items 570. DSL modeling system 235 illustratively allows the developer 218 to use domain-specific languages (DSLs) to describe the concepts (types) and their relationships to one another. It provides a framework for generating a comprehensive suite of types that, themselves, provide frameworks for development tools, applications, tools for applications, and other developer productivity tools that integrate into those tools.

In general, DSLs describe concepts (or abstractions) and the relations between them in a formal way. Relationships can be described using object-oriented design concepts, such as inheritance, association and composition. The base system 202 may have a number of concepts for developing applications, for instance, such as a class concept (that may contain X++ or other code), a table concept (that is a persistable set of values with code), a form concept (that surfaces information for a user in a user interface), a query concept, etc. Instances of these concepts (such as a customer table, an order processing class, a sales order form, etc.) in base system 202 may be referred to as metadata, and these can be used as building blocks of the final application that comprises base system 202 or customized system 204. DSL modeling system 235 is illustratively used to describe these concepts themselves, such as what constitutes a table, what makes a class, etc. These descriptions are data about metadata or meta-metadata. DSL modeling system 235 can be used to formally describe the notion of these concepts and use code generation techniques to generate several related sets of specific types that form the basis for building an application. Some sets of generated types can include types that represent serializable metadata, such as a table, a class, a form, etc. Instances of these types are designed by the application developer. For instance, the application developer may design what the customer table should look like and what the sales order form should look like, based upon the requirements of the organization deploying the application. The application runtime, at the time of running the application, creates, manages and persists specific instances of these types (such as the customer table type, the sales order type, etc.) and provides a framework and an environment for these instances to interact with one another. These interactions are what makes up the application that comprises customized system 204. The sets of generated types can also include types that are used to support the ability to create the above-described serializable types. These types are consumed by the design time developer tools (such as those in development environment 220). They provide the developer 218 with the capabilities to design the serializable types described above.

Yet another set of generated types include a set of types that are used to generate and navigate the references among the metadata instances (such as the references among the customer table and sales order form, etc.). These references are cross references and serve as a productivity tool for the developer 218.

In operation, DSL modeling system 235 first detects a user input indicating that the user wishes to engage DSL modeling system 235. This is indicated by block 572 in FIG. 11D.

The various components in DSL modeling system 235 then display DSL modeling user input mechanisms that can be actuated to generate various DSL type models. Displaying these user input mechanisms is indicated by block 574.

The corresponding component of DSL modeling system 235 then detects actuation of the user input mechanism in order to generate DSL type models. This is indicated by block 576. For example, application type modeling component 552 illustratively generates user interface displays that can be actuated to generate DSL-modeled application types 578 (shown in FIG. 11B). Difference generation type modeling component 554 illustratively generates user input mechanisms that can be actuated to generate difference generation types 580. Development tool type modeling component 556 illustratively displays user interface displays with user input mechanisms that can be actuated to generate development tool types 582. Behavior authoring type modeler 558 illustratively generates user interface displays that allow developer 218 to generate behavior authoring types 584. Similarly, property authoring type modeler 560 illustratively allows the developer to generate property authoring types 586. Other development tool types 588 can be authored as well.

Cross reference generation type modeling component 562 illustratively generates user interface displays, with user input mechanisms, that can be actuated to generate cross reference generation types 590. Application validation type modeling component 564 generates user interface displays, with user input mechanisms, that can be actuated to generate application validation types 592. Search type modeling component 566 generates user interface displays with user input mechanisms that can be actuated to generate search types 594, and other productivity type modeling components 568 can generate user interface displays, with user input mechanisms that can be actuated to generate other productivity types 596. The DSL-modeled types 597 in type store 595 can include other items 598 as well. It can thus be seen that the various DSL-modeled types 597 can be accessed within development environment 220. They can be used to actually generate application types 578, and a host of different types for the application development framework and tooling deployed within development environment 220. They can be used to generate types for generating cross references between the various application types 578 or other DSL-modeled types. They can be used to generate the difference types 580 that are used to generate differences between the various application types 578. They can also be used to generate a host of different application validation types 592, various development tool types 582 and other productivity types 596 that can be used within development environment 220.

When the user inputs are received to generate the various types in type store 595, then the corresponding components in DSL modeling system 235 generate the DSL type models. This is indicated by block 600 in FIG. 11D. It then saves the DSL type models to type store 595, where they can be used by development environment 220. This is indicated by block 602. In one example, they are stored as XML files. This is indicated by block 604. They can of course be stored in other ways as well, as indicated by block 606.

FIG. 11C shows is a block diagram of portions of the architecture shown in FIG. 2, with runtime environment 206 and application types store 550 shown in more detail. It can be seen in FIG. 11C that runtime environment 206 illustratively includes runtime engine 608, user interface component 610, processors or servers 612, and it can include other items 614. Environment 206 illustratively generates user interface displays 616, with user input mechanisms 618, for interaction by end users 208. End users 208 illustratively interact with user input mechanism 618 in order to control and manipulate the various applications or customized system 204 that is being run in runtime environment 206.

Runtime engine 608 illustratively accesses the various application types 578 stored in application types store 550, in order to run the applications comprising customized system 204. FIG. 11C shows that application types 578 can include a wide variety of different types. They can include entities 620, processes 622, security roles 624, workflows 626, tables 628, classes 630, forms 632, or a wide variety of other application types 634. Applications type store 550 can store other records or other information 636 as well.

Thus, runtime engine 608 illustratively accesses types 578 to perform processes 622 or workflows 626, referencing security roles 624, classes 630, forms 632, etc. It can also operate on entities 620 or a variety of other records.

Figure 12A:
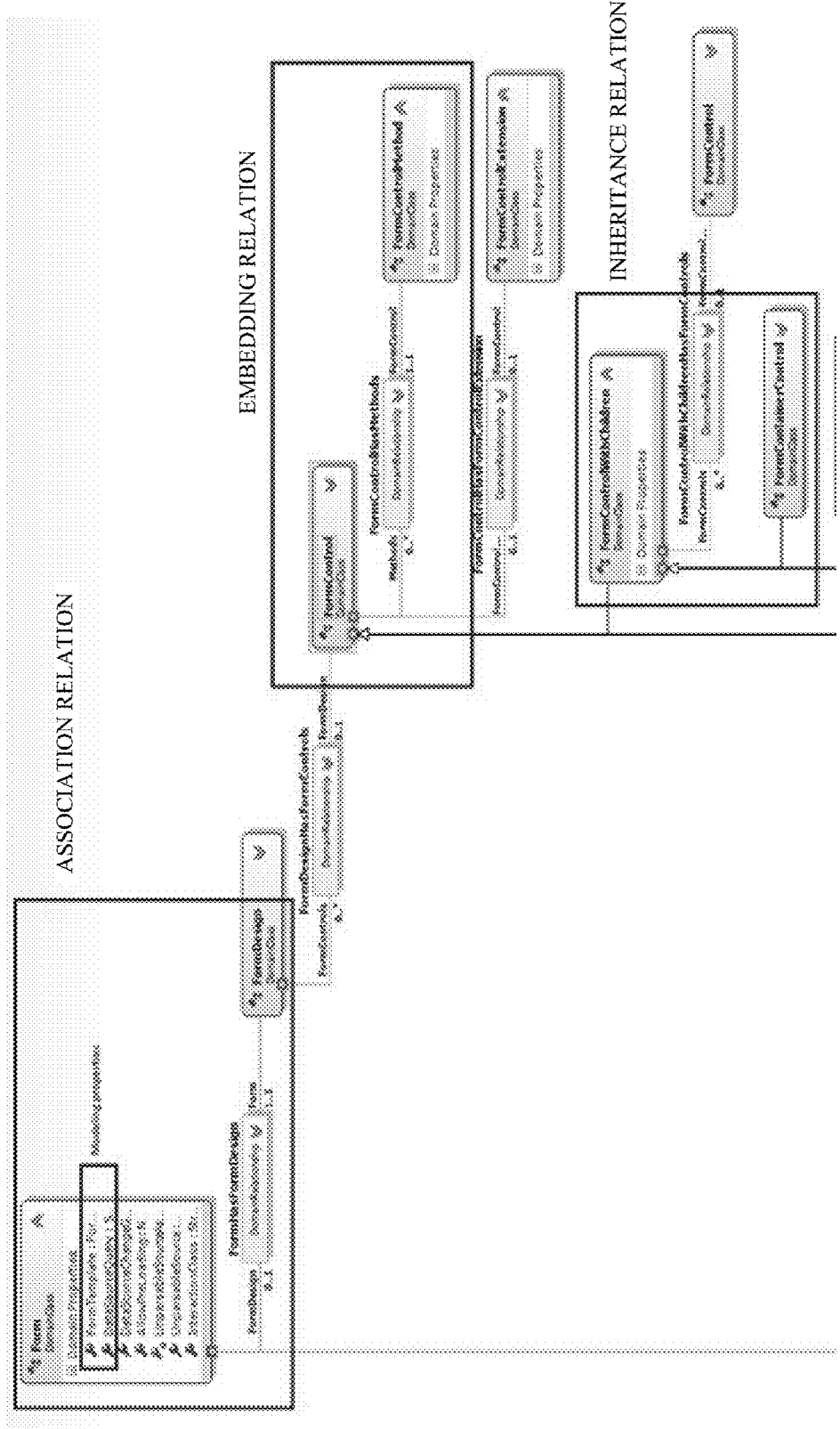
FIGS. 12A-12C show examples of user interface displays.
Figure 12B:
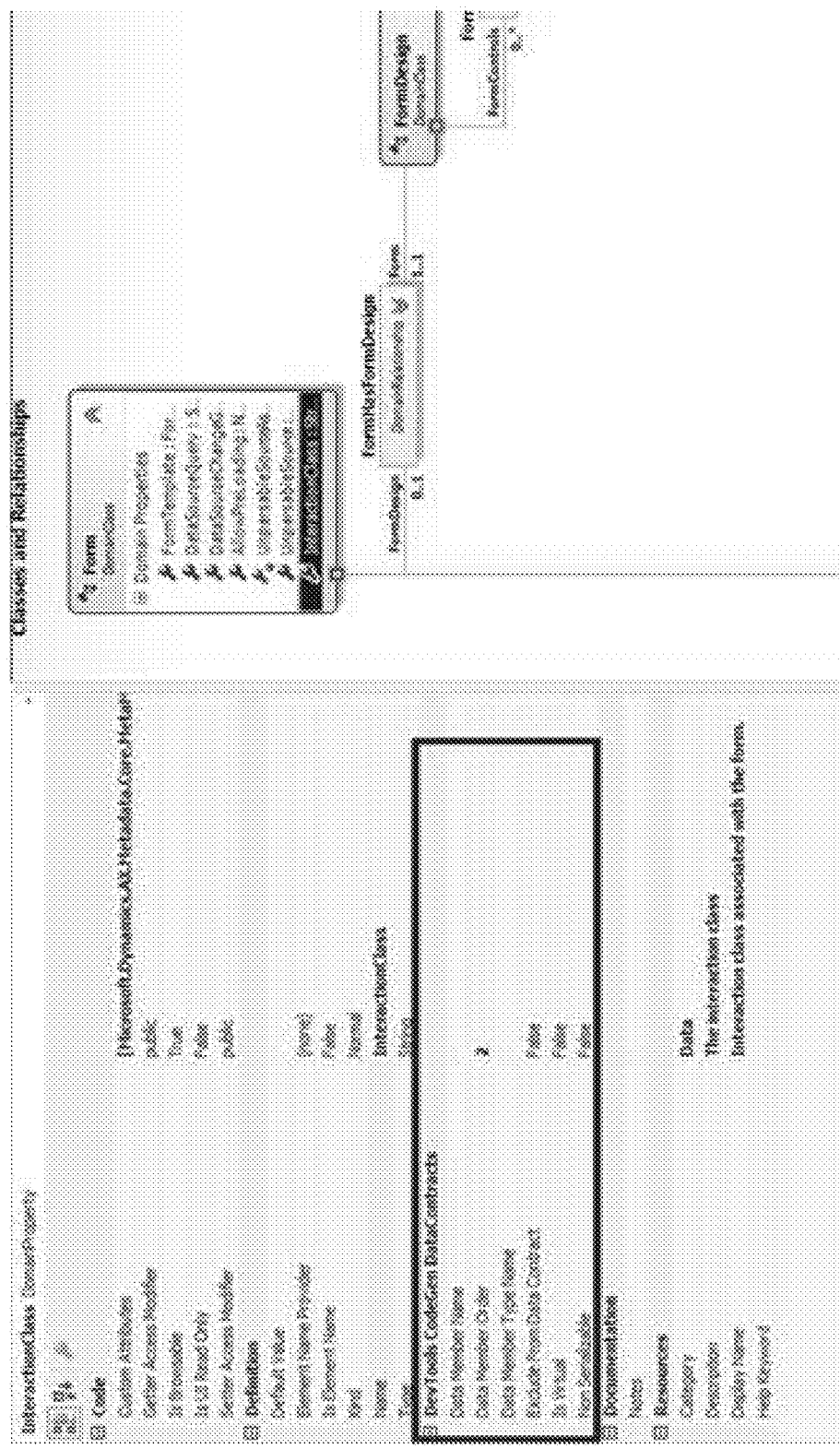
Figure 12C:
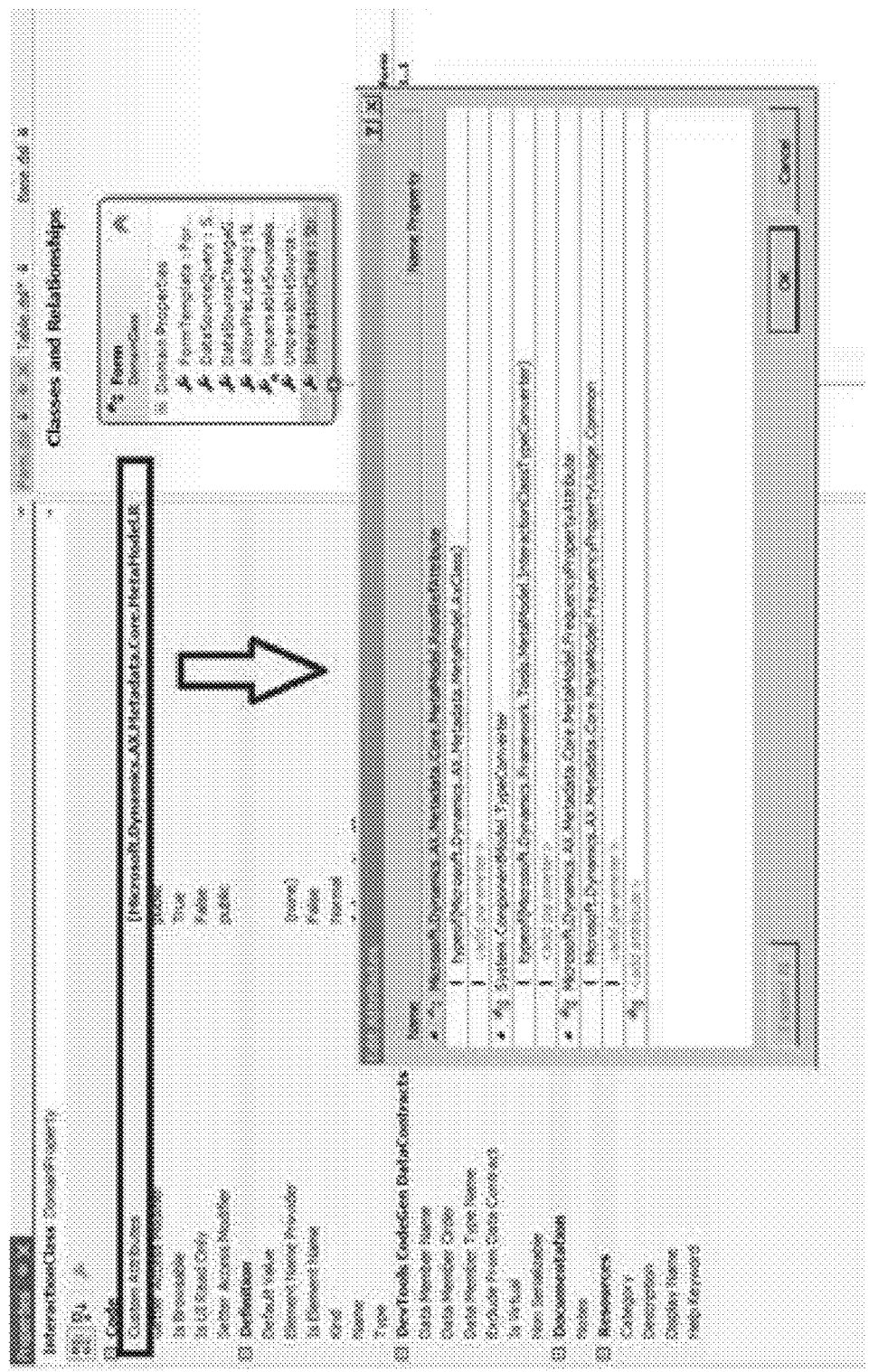

FIGS. 12A-12C show a set of example user interface displays that can be generated by DSL modeling system 235 in generating DSL-modeled types. FIG. 12A, for instance, shows a user interface display which includes user actuatable input mechanisms that can be actuates in order to generate a DSL-modeled form type. It can be seen that the form has a form design, and the form design has a set of form controls. The various controls can have methods, etc. By actuating the display elements in FIG. 12A, the developer can illustratively modify the DSL definition of a form.

FIG. 12B shows a user interface display that displays classes and relationships on the right, and a set of properties for a specific class (the interactions class) on the left. Again, the developer can interact with the display elements to generate or modify the DSL-modeled type.

FIG. 12C shows one example of editing a DSL model in more detail. It can be seen in FIG. 12C that a user has selected the "Custom Attributes" property. If the user actuates that display element (such as by right clicking n it or otherwise) this causes DSL modeling system 235 to display a popup menu that allows the user to edit the attributes. By selecting any of the various fields in the popup display, the user can modify or otherwise change the DSL model.

In one example, when the DSL models are generated by the various components of DSL modeling system 235, they are stored as XML documents. FIGS. 12D-1 to 12D-5 (collectively referred to herein as FIG. 12D) shows two different XML documents. The first is an XML document for DSL models of various types. It then shows an example XML document for a set of DSL extensions. Of course, the two DSL documents shown in FIG. 12D are shown for the sake of example only.

It can thus be seen that the present description provides significant technical advantages. By way of illustration, in some types of systems a developer typically has to manually hand-code a given customization across many different types within the base system. Conversely, the present framework, in one example, can apply customizations comprehensibly across an entire system for all types in a manner that is efficient, flexible, and requires less developer time and improves developer efficiency. The present development environment uses code generation to drive the framework implementation in a way that improves the customization system itself.

In one example, the framework uses deltas to store different layers of customization and to construct the customized system in a manner in which a runtime environment does not need to be aware of the deltas. The framework is able to apply the customization deltas in the correct order, and to store the deltas separately such that they can be easily removed from the system, for example in the case where an organization desires to remove proprietary information from the customized system. This can reduce the storage overhead required to store and implement the customized system.

Further, the present description provides a model framework that uses a meta model which allows a given object to be inspected at any time to determine what customizations have been made to the object. This is advantageous in an upgrade situation, for example, in which an organization desires to migrate customizations to a new system version. The model framework inspects the customized system to identify the customizations which are then applied to the new system version. This reduces the development time need to develop the upgrade system and can reduce the likelihood of development errors.

Further, the present description provides a visualization framework that generates visualizations to a developer to facilitate the development process. The visualizations can identify, among other things, customizations made to various elements as well as conflicts that arise due to conflicting customizations. For example, an integrated view improves the developer experience by allowing the developer to better understand what elements have been customized over various customization layers, how those elements have been customized, and what conflicts result from those customizations. This provides an integrated visual and design experience for modeling customizations along with multiple visual cues to distinguish the actual customizations. The developer can easily switch between different user interfaces, such as the integrated visualization and a non-integrated or filtered visualization, that provide different views of the customized system. Further, the developer can easily address and resolve the customization conflicts. This can enhance the user experience and provide for a more efficient and less error-prone development environment.

Further, the present description provides a DSL modeling system that advantageously allows a developer to use a domain-specific language to describe the concepts (or types) and the relationships. It allows the developer to have a framework for generating a comprehensive suite of types that themselves provide frameworks for development tools, applications, tools for applications and other developer productivity tools that integrate into those tools. By using DSL-modeled types, the types, themselves, can easily be modified by modifying the corresponding models. This model-driven approach greatly enhances the efficiency of the development environment. In prior systems, this information was often hard coded into a computing kernel thus, in order to change the structure or definition of a type, a great deal of manual, time consuming and error prone activity was needed. By modeling this information in DSL model, the developer need only modify the model, and the change is propagated all the way through the system, to the runtime environment.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 13:
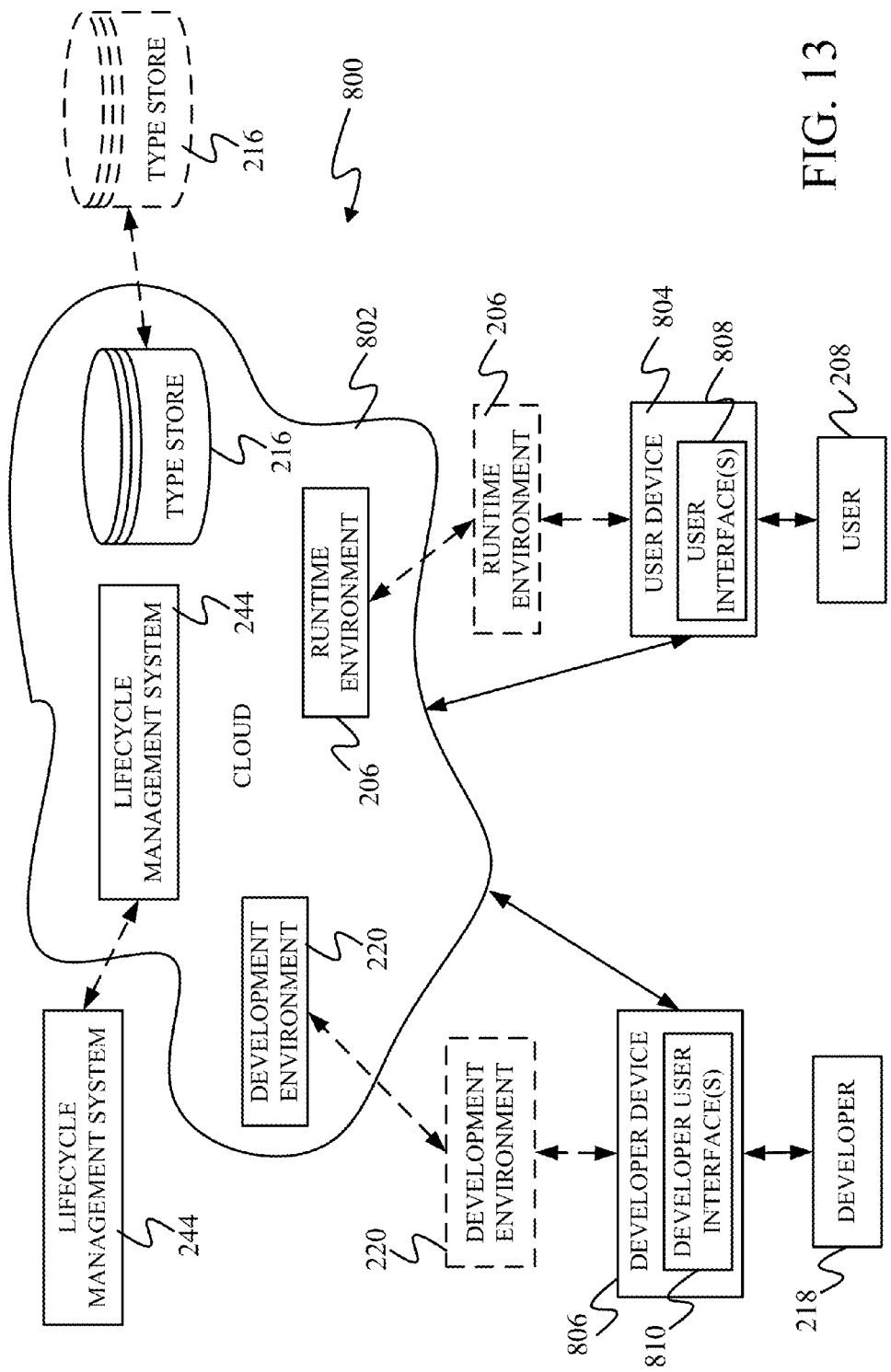
FIG. 13 is a block diagram showing one example of the architecture illustrated in FIG. 2, deployed in a cloud computing architecture.

FIG. 13 is a block diagram of architecture 200, shown in FIG. 2, except that its elements are disposed in a cloud computing architecture 800. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 200 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 13, some items are similar to those shown in FIG. 2 and they are similarly numbered. FIG. 13 specifically shows that runtime environment 206, development environment 220, type store 216, and lifecycle management system 244 can be located in cloud 802 (which can be public, private, or a combination where portions are public while others are private). Therefore, user 112 and developer 218 use a user device 804 and developer device 806, respectively, to access those systems through cloud 802. User device 804 renders user interfaces 808 to user 208 and developer device 806 renders user interfaces 810 to developer 218.

FIG. 13 also depicts another example of a cloud architecture. FIG. 13 shows that it is also contemplated that some elements of architecture 200 can be disposed in cloud 802 while others are not. By way of example, type store 216 can be disposed outside of cloud 802, and accessed through cloud 802. In another example, lifecycle management system 244 can also be outside of cloud 802, and accessed through cloud 802. In another example, runtime environment 206 and/or development environment 220 can also be outside of cloud 802, and accessed through cloud 802. Regardless of where they are located, they can be accessed directly by devices 804 and 806, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 200, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 14:
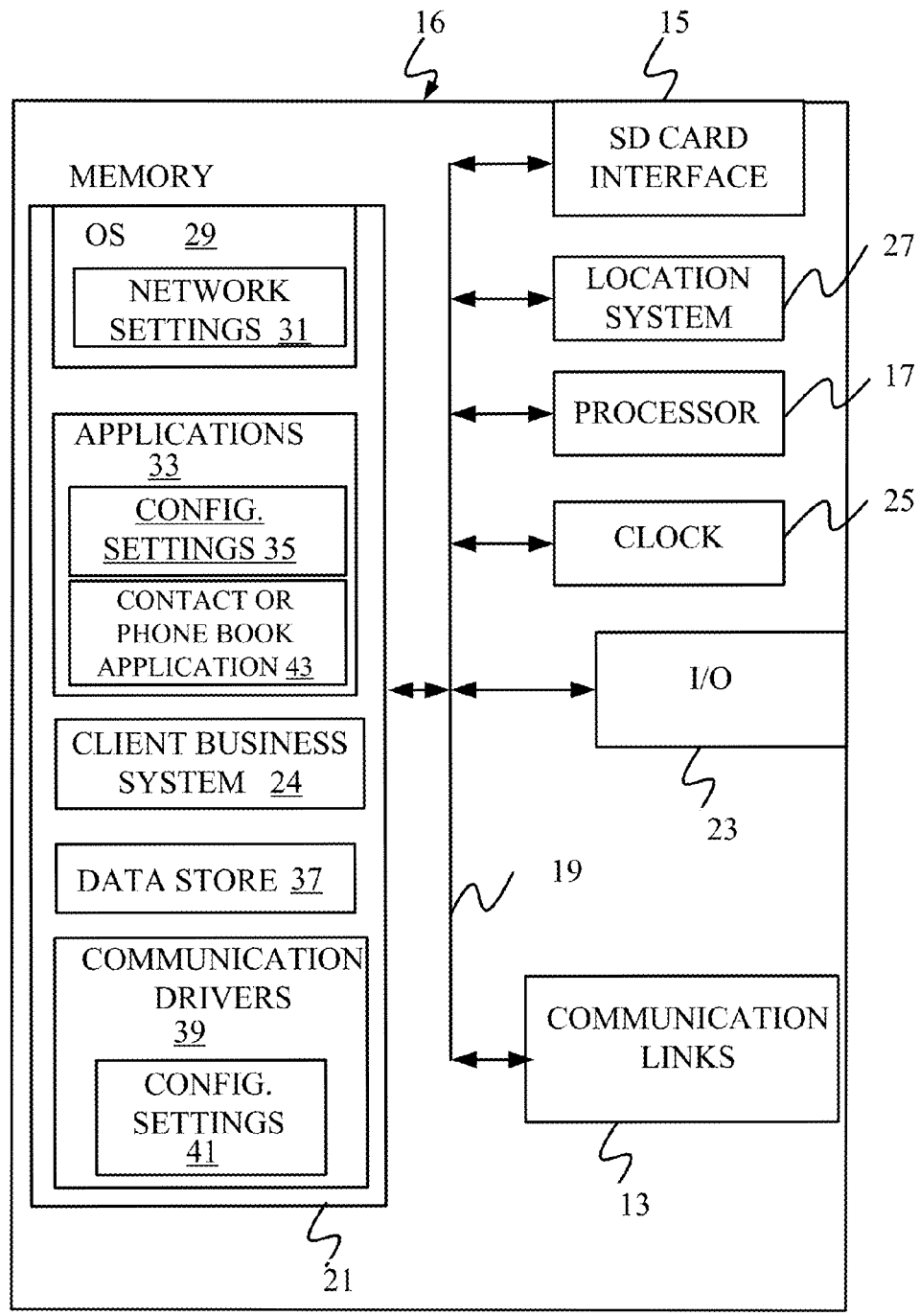
FIGS. 14-16 show various examples of mobile devices that can be used in the architectures discussed in the previous figures.
Figure 15:
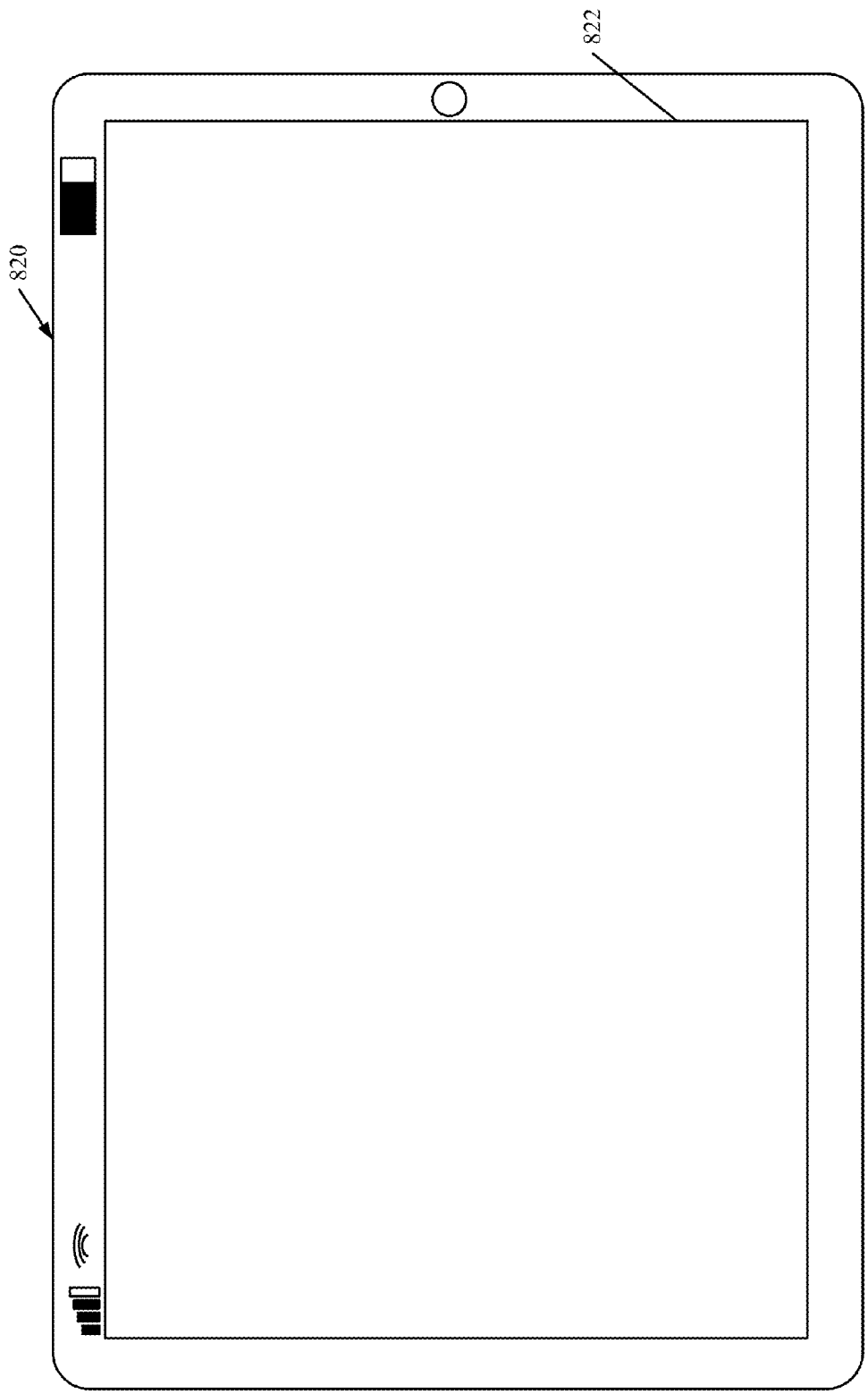
Figure 16:
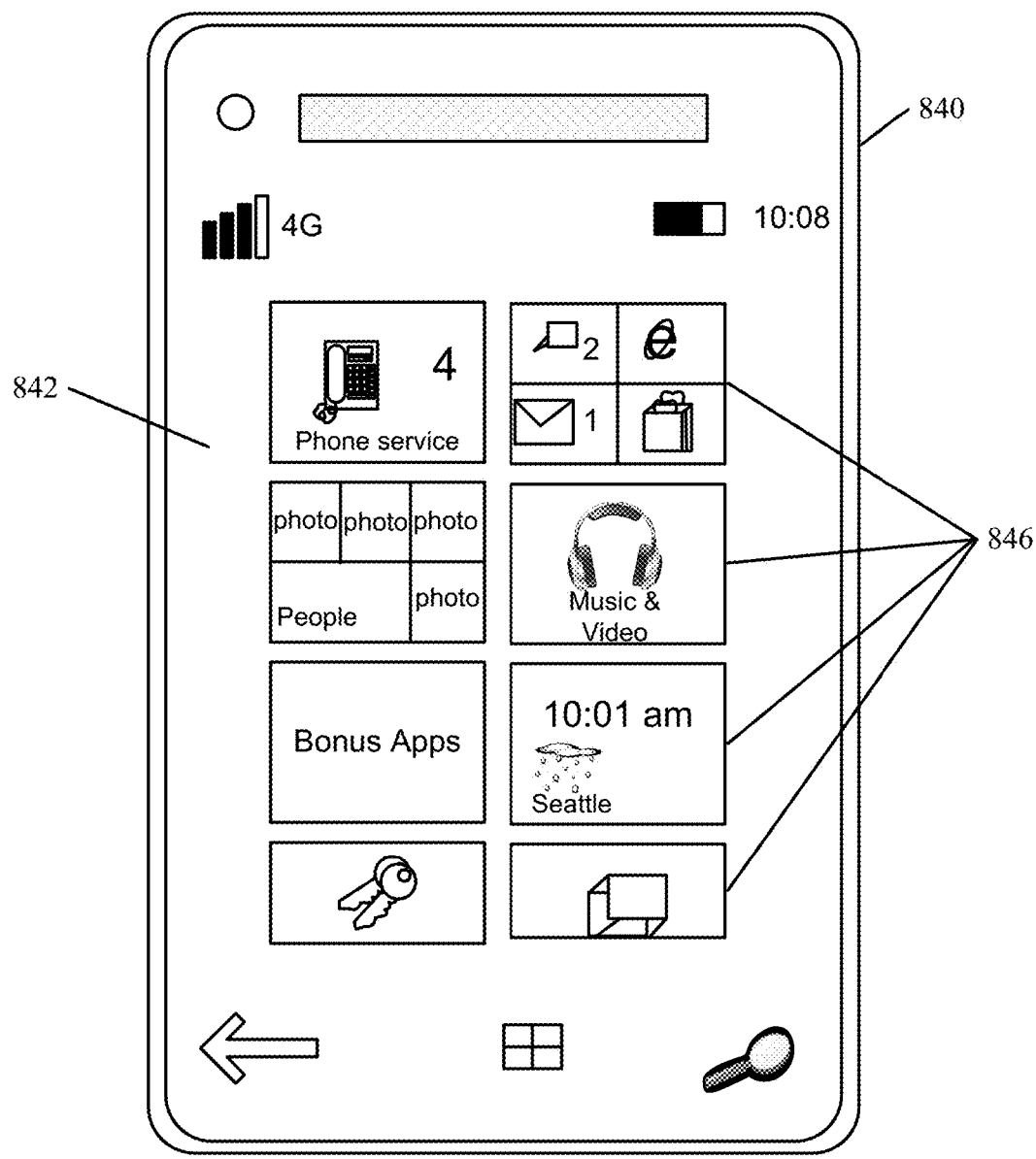

FIG. 14 is a simplified block diagram of one illustrative embodiment of a handheld or mobile computing device that can be used as a user's or client's hand held device 16, in which the present system (or parts of it) can be deployed. FIGS. 15-16 are examples of handheld or mobile devices.

FIG. 14 provides a general block diagram of the components of a client device 16 that can interact with architecture 200. In one example, client device 16 can run components of runtime environment 206 or development environment 220, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

Under other examples, applications or systems are received on a removable Secure Digital (SD) card that is connected to a SD card interface 15. SD card interface 15 and communication links 13 communicate with a processor 17 (which can also embody processor 226 from FIG. 2) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 15 shows one embodiment in which device 16 is a tablet computer 820. In FIG. 15, computer 820 is shown with user interface display screen 822. Screen 822 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 820 can also illustratively receive voice inputs as well.

Additional examples of devices 16 can also be used. Device 16 can be a feature phone, smart phone or mobile phone. The phone can include a set of keypads for dialing phone numbers, a display capable of displaying images including application images, icons, web pages, photographs, and video, and control buttons for selecting items shown on the display. The phone includes an antenna for receiving cellular phone signals such as General Packet Radio Service (GPRS) and 1Xrtt, and Short Message Service (SMS) signals. In some examples, the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 16 shows that the phone can be a smart phone 840. Smart phone 840 has a touch sensitive display 842 that displays icons or tiles or other user input mechanisms 844. Mechanisms 844 can be used by a user to run applications, make calls, perform data transfer operations, etc. In general, smart phone 840 is built on a mobile operating system and offers more advanced computing capability and connectivity than a feature phone.

Note that other forms of the devices 16 are possible.

Figure 17:
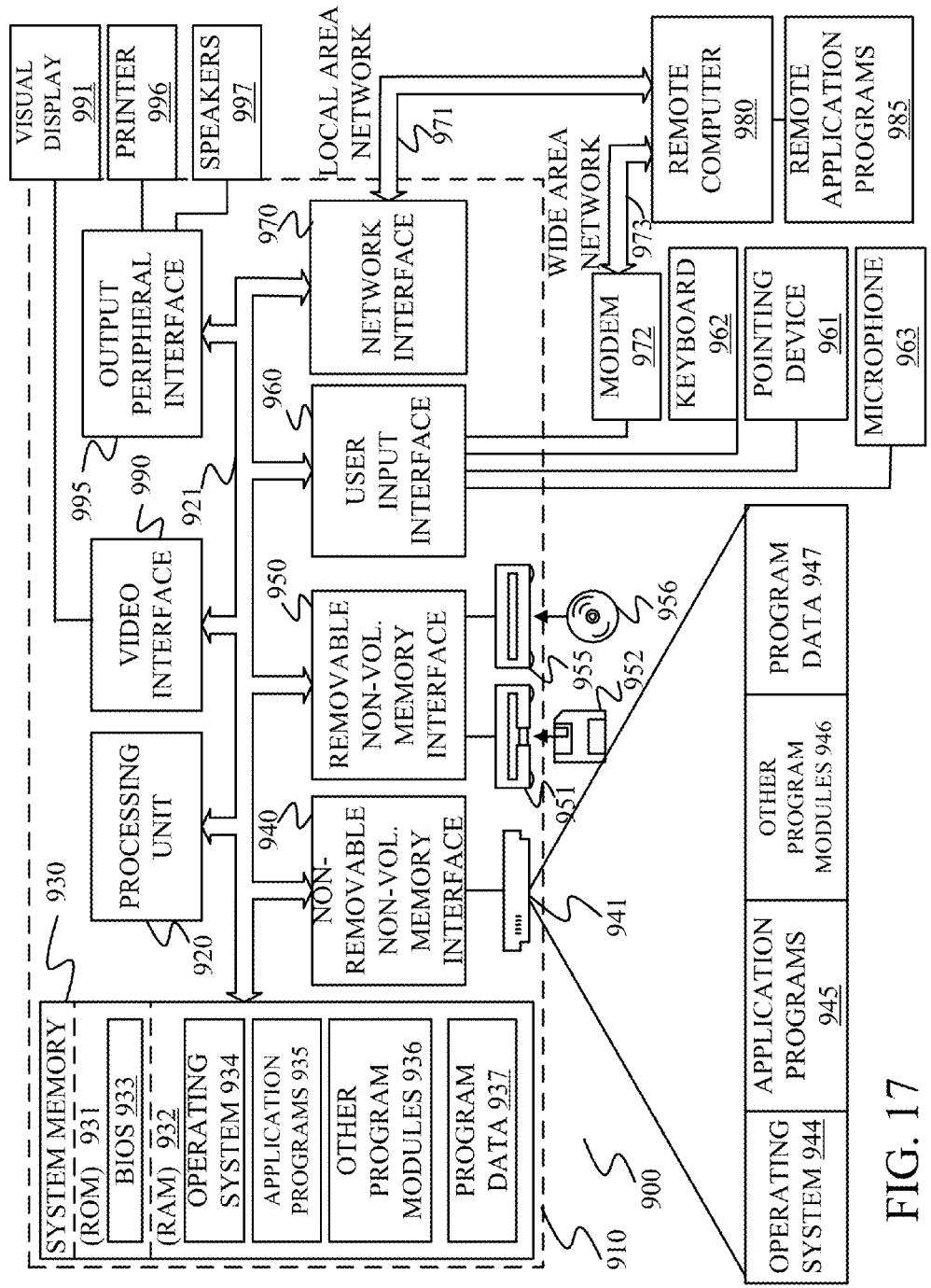
FIG. 17 is a block diagram of one example of a computing environment that can be used in various parts of the architectures set out in the previous figures.

FIG. 17 is one embodiment of a computing environment in which architecture 200, or parts of it, (for example) can be deployed. With reference to FIG. 17, an exemplary system for implementing some embodiments includes a general-purpose computing device in the form of a computer 910. Components of computer 910 may include, but are not limited to, a processing unit 920 (which can comprise any of the processors discussed above), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 2 can be deployed in corresponding portions of FIG. 17.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 17 illustrates operating system 934, application programs 935, other program modules 936, and program data 937.

The computer 910 may also include other removable/non-removable volatile/nonvolatile computer storage media. By way of example only, FIG. 17 illustrates a hard disk drive 941 that reads from or writes to non-removable, nonvolatile magnetic media, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and optical disk drive 955 are typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 17, provide storage of computer readable instructions, data structures, program modules and other data for the computer 910. In FIG. 17, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections to one or more remote computers, such as a remote computer 980. The remote computer 980 may be a personal computer, a hand-held device, a server, a router, a network PC, a peer device or other common network node, and typically includes many or all of the elements described above relative to the computer 910. The logical connections depicted in FIG. 17 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 17 illustrates remote application programs 985 as residing on remote computer 980. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system comprising a difference generation component configured to access a type file representing a type in a base version of a computing system and identify a customization made to the type in the base version of the computing system to obtain a customized version of the computing system, and a type accessing component configured to serialize the customization into a customization file of a given file format, the customization file having a separate element representing each customization made to the type in the base version of the computing system to obtain the customized version of the computing system, the type accessing component storing the customization file as a separate file from the type file.

Example 2 is the computing system of any or all previous examples, wherein the type accessing component serializes the customization into an extensible markup language (XML) file.

Example 3 is the computing system of any or all previous examples, wherein the difference generation component is configured to analyze the type with the customization applied against a meta model that defines a type system framework that specifies a structure of individual types in the base version, to identify the customization.

Example 4 is the computing system of any or all previous examples, wherein the difference generation component is configured to inspect primitive components in the type with the customization applied, to identify the customization.

Example 5 is the computing system of any or all previous examples, wherein the difference generation component comprises a primitive difference computing component configured to disassemble the type with the customization applied into its primitive components, and compare the primitive components to corresponding primitive components in the type in the base version.

Example 6 is the computing system of any or all previous examples, wherein the difference generation component is configured to detect an input to construct the customized version of the computing system, access the stored customization file, de-serialize the customization file to obtain the customization to the type, access the type file representing the type in the base version, construct the customized version by applying the customization to the type in the base version, and output the customized version for use in a use environment.

Example 7 is the computing system of any or all previous examples, wherein the customization file and the type file are de-serialized into corresponding object representations.

Example 8 is the computing system of any or all previous examples, wherein the difference generation component comprises a primitive difference application component configured to disassemble the type in the base version into its primitive components and apply the customization to the primitive components.

Example 9 is the computing system of any or all previous examples, wherein the difference generation component is configured to identify customizations made to the type in a plurality of different customization layers, and the type accessing component is configured to serialize the customizations from each customization layer into a separate customization file.

Example 10 is a computer-implemented method comprising accessing a type file representing a type in a base version of a computing system, identifying a customization made to the type in the base version of the computing system to obtain a customized version of the computing system, serializing the customization into a customization file of a given file format, the customization file having a separate element representing each customization made to the type in the base version of the computing system to obtain the customized version of the computing system, and storing the customization file as a separate file from the type file.

Example 11 is the computer-implemented method of any or all previous examples, wherein serializing comprises serializing the customization into an extensible markup language (XML) file.

Example 12 is the computer-implemented method of any or all previous examples, wherein identifying the customization comprises analyzing the type with the customization applied against a meta model that defines a type system framework that specifies a structure of individual types in the base version.

Example 13 is the computer-implemented method of any or all previous examples, wherein identifying the customization comprises inspecting primitive components in the type with the customization applied.

Example 14 is the computer-implemented method of any or all previous examples, wherein identifying the customization comprises disassembling the type with the customization applied into its primitive components, and comparing the primitive components to corresponding primitive components in the type in the base version.

Example 15 is the computer-implemented method of any or all previous examples, and further comprising detecting an input to construct the customized version of the computing system, accessing the stored customization file, de-serializing the customization file to obtain the customization to the type, accessing the type file representing the type in the base version, constructing the customized version by applying the customization to the type in the base version, and outputting the customized version for use in a use environment.

Example 16 is the computer-implemented method of any or all previous examples, wherein the customization file and the type file are de-serialized into corresponding object representations.

Example 17 is the computer-implemented method of any or all previous examples, wherein constructing the customized version comprises disassembling the type in the base version into its primitive components, and applying the customization to the primitive components.

Example 18 is the computer-implemented method of any or all previous examples, and further comprising, identifying customizations made to the type in a plurality of different customization layers, and serializing the customizations from each customization layer into a separate customization file.

Example 19 is a computing system comprising a difference generation component configured to access a type file representing a type in a base version of a computing system and identify a customization made to the type in the base version of the computing system to obtain a customized version of the computing system, wherein the difference generation component identifies the customization by analyzing the type with the customization applied against a meta model that defines a type system framework that specifies a structure of individual types in the base version, the difference generation component comprising a primitive difference computing component configured to inspect primitive components in the type with the customization applied, and a type accessing component configured to serialize the customization into a customization file of a given file format, the customization file having a separate element representing each customization made to the type in the base version of the computing system to obtain the customized version of the computing system, the type accessing component storing the customization file as a separate file from the type file.

Example 20 is the computing system of any or all previous examples, wherein the primitive difference computing component is configured to disassemble the type with the customization applied into its primitive components, and compare the primitive components to corresponding primitive components in the type in the base version.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What is claimed is:

1. A computing system comprising:
   a processor; and
   memory storing instructions executable by the processor, wherein the instructions, when executed, configure the computing system to:
   access a type file representing a type in a first version of a computing system, wherein an object model defines a structure of properties and methods that define behavior of a runtime object derived from the type;
   based on application of the object model to a second, customized version of the computing system, identify a customization made to the type in the first version of the computing system to obtain the second, customized version of the computing system;
   serialize the identified customization into a customization file that is separate from the type file and stores a particular element representing the identified customization;
   map the customization file to the type file; and
   based on an indication of a request to execute the customized version in a runtime environment:
   access the customization file based on the map,
   de-serialize the customization file into a corresponding object representation of the customization,
   access the type file representing the type, and
   construct the customized version by applying the object representation of the customization to the type in the first version.

2. The computing system of claim 1, wherein the customization file comprises an extensible markup language (XML) file.

3. The computing system of claim 1, wherein the instructions, when executed, configure the computing system to:
   based on analysis of the type against the object model, identify a customization made to a particular primitive component in the type in the first version.

4. The computing system of claim 3, wherein the instructions, when executed, configure the computing system:
   serialize the customization made to the particular primitive component into the customization file.

5. The computing system of claim 4, wherein the object model represents a type system, and wherein the instructions, when executed, configure the computing system to:
   identify primitive components in the type in the first version based on the type system; and
   compare primitive components in the second, customized version to the corresponding primitive components in the type in the first version to identify a delta indicative of a customization difference between the first and second versions.

6. The computing system of claim 1, wherein the instructions, when executed, configure the computing system to:
   construct the customized version by disassembling the type in the first version into its primitive components and applying the object representation of the customization to the primitive components.

7. The computing system of claim 1, wherein the instructions, when executed, configure the computing system to:
- identify customizations made to the type in a plurality of different customization layers; and
- serialize the customizations from the customization layers into separate customization files, each customization file corresponding to a particular one of the customization layers.

8. A computer-implemented method comprising:
- accessing a type file representing a type in a first version of a computing system, wherein an object model defines a structure of properties and methods that define behavior of a runtime object derived from the type;
- based on application of the object model to a second, customized version of the computing system, identifying a customization made to the type in the first version of the computing system to obtain the second, customized version of the computing system;
- serializing the identified customization into a customization file that is separate from the type file and stores a particular element representing the identified customization;
- mapping the customization file to the type file; and
- based on an indication of a request to execute the customized version in a runtime environment:
  - accessing the customization file based on the map,
  - de-serializing the customization file into a corresponding object representation of the customization,
  - accessing the type file representing the type, and
  - constructing the customized version by applying the object representation of the customization to the type in the first version.

9. The computer-implemented method of claim 8, wherein the customization file comprises an extensible markup language (XML) file.

10. The computer-implemented method of claim 8, wherein identifying the customization comprises:
- based on analysis of the type against the object model, identifying a customization made to a particular primitive component in the type in the first version.

11. The computer-implemented method of claim 10, wherein identifying the customization comprises serializing the customization made to the particular primitive component into the customization file.

12. The computer-implemented method of claim 10, wherein the object model represents a type system, and identifying the customization comprises:
- identifying primitive components in the type in the first version based on the type system; and
- identifying a delta indicative of a customization difference between the first and second versions based on a comparison of primitive components in the second, customized version to the corresponding primitive components in the type in the first version.

13. The computer-implemented method of claim 8, wherein constructing the customized version comprises:
- disassembling the type in the first version into its primitive components; and
- applying the object representation to the primitive components.

14. The computer-implemented method of claim 8, and further comprising:
- identifying customizations made to the type in a plurality of different customization layers; and
- serializing the customizations from the customization layers into separate customization files, each customization file corresponding to a particular one of the customization layers.

* * * * *